(12) United States Patent
Akkarakaran et al.

(10) Patent No.: US 11,115,242 B2
(45) Date of Patent: Sep. 7, 2021

(54) UPLINK MULTI-BEAM OPERATION

(71) Applicant: QUALCOMM incorporated, San Diego, CA (US)

(72) Inventors: Sony Akkarakaran, Poway, CA (US); Tao Luo, San Diego, CA (US); Xiao Feng Wang, San Diego, CA (US); Makesh Pravin John Wilson, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/381,723

(22) Filed: Apr. 11, 2019

(65) Prior Publication Data

US 2019/0319823 A1 Oct. 17, 2019

Related U.S. Application Data

(60) Provisional application No. 62/657,583, filed on Apr. 13, 2018.

(51) Int. Cl.
*H04L 25/02* (2006.01)
*H04B 7/0408* (2017.01)
(Continued)

(52) U.S. Cl.
CPC ....... *H04L 25/0226* (2013.01); *H04B 7/0408* (2013.01); *H04L 5/0023* (2013.01);
(Continued)

(58) Field of Classification Search
CPC . H04L 25/0226; H04L 5/0023; H04L 5/0051; H04L 5/0053; H04L 5/0082;
(Continued)

(56) References Cited

U.S. PATENT DOCUMENTS

2013/0250924 A1 9/2013 Chen et al.
2015/0098371 A1 4/2015 Vajapeyam et al.
(Continued)

FOREIGN PATENT DOCUMENTS

EP 3435555 A1 1/2019
WO WO-2017164221 A1 9/2017

OTHER PUBLICATIONS

International Search Report and Written Opinion—PCT/US2019/027313—ISA/EPO—dated Jul. 24, 2019.

*Primary Examiner* — Kent Krueger
(74) *Attorney, Agent, or Firm* — Alan Gordon

(57) ABSTRACT

Methods, systems, and devices for wireless communications are described. A base station may transmit, and a user equipment (UE) may receive, a downlink control signal indicating that an uplink control signal is to be transmitted using two or more transmission beams during different transmission time intervals (TTIs). The UE may identify the two or more transmission beams based at least in part on the downlink control signal, and may transmit a plurality of repetitions of an uplink signal on the two or more transmissions beams. Each repetition may be transmitted on a different TTI using a different one of the two or more transmission beams based at least in part on the downlink control signal.

30 Claims, 26 Drawing Sheets

(51) Int. Cl.
  *H04B 7/0404* (2017.01)
  *H04L 5/00* (2006.01)
  *H04W 72/04* (2009.01)
  *H04W 76/27* (2018.01)
  *H04W 80/02* (2009.01)
  *H04W 72/14* (2009.01)

(52) U.S. Cl.
  CPC .......... *H04L 5/0051* (2013.01); *H04L 5/0053* (2013.01); *H04L 5/0082* (2013.01); *H04W 72/042* (2013.01); *H04W 72/046* (2013.01); *H04W 72/14* (2013.01); *H04W 76/27* (2018.02); *H04W 80/02* (2013.01); *H04B 7/0404* (2013.01)

(58) Field of Classification Search
  CPC . H04B 7/0404; H04B 7/0408; H04W 72/042; H04W 72/046; H04W 72/14
  See application file for complete search history.

(56) References Cited

U.S. PATENT DOCUMENTS

| | | | |
|---|---|---|---|
| 2016/0095105 A1 | 3/2016 | Chen et al. | |
| 2017/0366311 A1* | 12/2017 | Iyer | H04L 5/0007 |
| 2018/0309496 A1* | 10/2018 | Lee | H04L 5/0053 |

* cited by examiner

UPLINK MULTI-BEAM OPERATION

CROSS REFERENCE

The present application for patent claims the benefit of U.S. Provisional Patent Application No. 62/657,583 by Akkarakaran, et al., entitled "Uplink Multi-Beam Operation," filed Apr. 13, 2018, assigned to the assignee hereof, and expressly incorporated herein by reference in its entirety.

BACKGROUND

The following relates generally to wireless communication, and more specifically to uplink multi-beam operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, multi-beam operation may be used. For example, a UE may be capable of transmitting using a plurality of transmission beams. The UE may operate in a multi-beam mode by transmitting signals on two or more of the transmission beams.

SUMMARY

The described techniques relate to improved methods, systems, devices, or apparatuses that support uplink multi-beam operation. Generally, the described techniques provide for enabling multi-beam operation for uplink control and data signals. A base station may transmit a downlink control signal to a UE. The UE may identify two or more transmission beams based at least in part on the downlink control signal, and may transmit a plurality of repetitions of an uplink signal on the two or more transmissions beams.

A method of wireless communication is described. The method may include receiving, by a user equipment (UE), a downlink control signal indicating that an uplink control signal is to be transmitted using two or more transmission beams during different transmission time intervals (TTIs), identifying the two or more transmission beams based at least in part on the downlink control signal, and transmitting a plurality of repetitions of the uplink control signal, where each repetition is transmitted on a different TTI using a different one of the two or more transmission beams based at least in part on the downlink control signal.

An apparatus for wireless communication is described. The apparatus may include means for receiving, by a user equipment (UE), a downlink control signal indicating that an uplink control signal is to be transmitted using two or more transmission beams during different transmission time intervals (TTIs), means for identifying the two or more transmission beams based at least in part on the downlink control signal, and means for transmitting a plurality of repetitions of the uplink control signal, where each repetition is transmitted on a different TTI using a different one of the two or more transmission beams based at least in part on the downlink control signal.

Another apparatus for wireless communication is described. The apparatus may include a processor, memory coupled with the processor, and instructions stored in the memory. The instructions may be operable to cause the processor to receive, by a user equipment (UE), a downlink control signal indicating that an uplink control signal is to be transmitted using two or more transmission beams during different transmission time intervals (TTIs), identify the two or more transmission beams based at least in part on the downlink control signal, and transmit a plurality of repetitions of the uplink control signal, where each repetition is transmitted on a different TTI using a different one of the two or more transmission beams based at least in part on the downlink control signal.

A non-transitory computer-readable medium for wireless communication is described. The non-transitory computer-readable medium may include instructions operable to cause a processor to receive, by a user equipment (UE), a downlink control signal indicating that an uplink control signal is to be transmitted using two or more transmission beams during different transmission time intervals (TTIs), identify the two or more transmission beams based at least in part on the downlink control signal, and transmit a plurality of repetitions of the uplink control signal, where each repetition is transmitted on a different TTI using a different one of the two or more transmission beams based at least in part on the downlink control signal.

In some examples, of the method, apparatus, and non-transitory computer-readable medium described above the downlink control signal may be a radio resource control (RRC) signal. Some examples of the method, apparatus, and non-transitory computer-readable medium described above may further include processes, features, means, or instructions for receiving a beam cycling information element in the RRC signal, the beam cycling information element indicating a number of the two or more transmission beams.

In some examples of the method, apparatus, and non-transitory computer-readable medium described above, the beam cycling information element may be associated with one or more of: an uplink resource of the uplink control signal or a type of uplink resource of the uplink control signal.

In some examples, of the method, apparatus, and non-transitory computer-readable medium described above the downlink control signal may be an uplink grant. Some examples of the method, apparatus, and non-transitory computer-readable medium described above may further include processes, features, means, or instructions for identifying different sets of uplink resources for different repetitions of the uplink control signal based at least in part on the uplink grant, where each set of uplink resources may be associated with a different one of the two or more transmission beams.

In some examples of the method, apparatus, and non-transitory computer-readable medium described above, the uplink grant may include a persistent or semi-persistent grant.

Some examples of the method, apparatus, and non-transitory computer-readable medium described above may further include processes, features, means, or instructions for receiving a plurality of spatial relation information elements, each spatial relation information element associated with a different transmission beam, where identifying the two or more transmission beams may be further based at least in part on the plurality of spatial relation information elements.

In some examples of the method, apparatus, and non-transitory computer-readable medium described above, identifying the two or more transmission beams may include selecting the two or more transmission beams based at least in part on an order of the plurality of spatial relation information elements.

In some examples of the method, apparatus, and non-transitory computer-readable medium described above, identifying the two or more transmission beams may include receiving a medium access control (MAC) control element (CE) indicating a set of spatial relation information elements corresponding to the two or more transmission beams in the plurality of received spatial relation information elements.

In some examples of the method, apparatus, and non-transitory computer-readable medium described above, an order of transmitting the plurality of repetitions of the uplink control signal may be based at least in part on an order of the received spatial relation information elements.

In some examples of the method, apparatus, and non-transitory computer-readable medium described above, transmitting the plurality of repetitions of the uplink control signal using the two or more transmission beams may include cycling through the two or more transmission beams based at least in part on a transmitted TTI index, an absolute TTI index associated with the uplink control signal, or a group of TTIs associated with the uplink control signal (i.e., per N-TTI basis).

Some examples of the method, apparatus, and non-transitory computer-readable medium described above may further include processes, features, means, or instructions for selecting a power control parameter for transmitting each of the plurality of repetitions of the uplink control signal.

In some examples of the method, apparatus, and non-transitory computer-readable medium described above, a first power control parameter for transmission in a first TTI may be selected based at least in part on a previous power control parameter for transmission in a previous TTI.

In some examples of the method, apparatus, and non-transitory computer-readable medium described above, the first power control parameter for transmission in the first TTI may be selected based at least in part on the first TTI.

A method of wireless communication is described. The method may include identifying two or more transmission beams for receiving an uplink control signal from a user equipment (UE), transmitting to the UE a downlink control signal indicating that the uplink control signal is to be transmitted using the two or more transmission beams during different transmission time intervals (TTIs), and receiving a plurality of repetitions of the uplink control signal from the UE, where each repetition is received on a different TTI using a different one of the two or more transmission beams based at least in part on the downlink control signal.

An apparatus for wireless communication is described. The apparatus may include means for identifying two or more transmission beams for receiving an uplink control signal from a user equipment (UE), means for transmitting to the UE a downlink control signal indicating that the uplink control signal is to be transmitted using the two or more transmission beams during different transmission time intervals (TTIs), and means for receiving a plurality of repetitions of the uplink control signal from the UE, where each repetition is received on a different TTI using a different one of the two or more transmission beams based at least in part on the downlink control signal.

Another apparatus for wireless communication is described. The apparatus may include a processor, memory coupled with the processor, and instructions stored in the memory. The instructions may be operable to cause the processor to identify two or more transmission beams for receiving an uplink control signal from a user equipment (UE), transmit to the UE a downlink control signal indicating that the uplink control signal is to be transmitted using the two or more transmission beams during different transmission time intervals (TTIs), and receive a plurality of repetitions of the uplink control signal from the UE, where each repetition is received on a different TTI using a different one of the two or more transmission beams based at least in part on the downlink control signal.

A non-transitory computer-readable medium for wireless communication is described. The non-transitory computer-readable medium may include instructions operable to cause a processor to identify two or more transmission beams for receiving an uplink control signal from a user equipment (UE), transmit to the UE a downlink control signal indicating that the uplink control signal is to be transmitted using the two or more transmission beams during different transmission time intervals (TTIs), and receive a plurality of repetitions of the uplink control signal from the UE, where each repetition is received on a different TTI using a different one of the two or more transmission beams based at least in part on the downlink control signal.

In some examples, of the method, apparatus, and non-transitory computer-readable medium described above the downlink control signal may be a radio resource control (RRC) signal. Some examples of the method, apparatus, and non-transitory computer-readable medium described above may further include processes, features, means, or instructions for including a beam cycling information element in the RRC signal, the beam cycling information element indicating a number of the two or more transmission beams.

In some examples of the method, apparatus, and non-transitory computer-readable medium described above, the downlink control signal may include a list of the two or more transmission beams to be used for transmitting the uplink control signal.

Some examples of the method, apparatus, and non-transitory computer-readable medium described above may further include processes, features, means, or instructions for transmitting a medium access control (MAC) control element (CE), where the MAC-CE may include a list of two or more spatial relation information elements.

In some examples of the method, apparatus, and non-transitory computer-readable medium described above, the two or more spatial relation information elements may be listed in an order to be used for beam cycling.

In some examples of the method, apparatus, and non-transitory computer-readable medium described above, the downlink control signal may include an uplink grant for the uplink control signal, the uplink grant identifying different sets of uplink resources for different repetitions of the uplink control signal, where each set of uplink resources may be associated with a different one of the two or more transmission beams.

A method of wireless communication is described. The method may include receiving, by a user equipment (UE), downlink control information (DCI) indicating that an uplink data signal is to be transmitted using two or more transmission beams during different transmission time intervals (TTIs) and at least one sounding reference signal (SRS) resource indicator, determining, based at least in part on the at least one SRS resource indicator, a transmission beam cycling scheme for the uplink data signal, and transmitting a plurality of repetitions of the uplink data signal, where each repetition is transmitted on a different TTI using a different one of the two or more transmission beams based at least in part on the transmission beam cycling scheme.

An apparatus for wireless communication is described. The apparatus may include means for receiving, by a user equipment (UE), downlink control information (DCI) indicating that an uplink data signal is to be transmitted using two or more transmission beams during different transmission time intervals (TTIs) and at least one sounding reference signal (SRS) resource indicator, means for determining, based at least in part on the at least one SRS resource indicator, a transmission beam cycling scheme for the uplink data signal, and means for transmitting a plurality of repetitions of the uplink data signal, where each repetition is transmitted on a different TTI using a different one of the two or more transmission beams based at least in part on the transmission beam cycling scheme.

Another apparatus for wireless communication is described. The apparatus may include a processor, memory coupled with the processor, and instructions stored in the memory. The instructions may be operable to cause the processor to receive, by a user equipment (UE), downlink control information (DCI) indicating that an uplink data signal is to be transmitted using two or more transmission beams during different transmission time intervals (TTIs) and at least one sounding reference signal (SRS) resource indicator, determine, based at least in part on the at least one SRS resource indicator, a transmission beam cycling scheme for the uplink data signal, and transmit a plurality of repetitions of the uplink data signal, where each repetition is transmitted on a different TTI using a different one of the two or more transmission beams based at least in part on the transmission beam cycling scheme.

A non-transitory computer-readable medium for wireless communication is described. The non-transitory computer-readable medium may include instructions operable to cause a processor to receive, by a user equipment (UE), downlink control information (DCI) indicating that an uplink data signal is to be transmitted using two or more transmission beams during different transmission time intervals (TTIs) and at least one sounding reference signal (SRS) resource indicator, determine, based at least in part on the at least one SRS resource indicator, a transmission beam cycling scheme for the uplink data signal, and transmit a plurality of repetitions of the uplink data signal, where each repetition is transmitted on a different TTI using a different one of the two or more transmission beams based at least in part on the transmission beam cycling scheme.

In some examples, of the method, apparatus, and non-transitory computer-readable medium described above the at least one SRS resource indicator may be two or more SRS resource indicators. Some examples of the method, apparatus, and non-transitory computer-readable medium described above may further include processes, features, means, or instructions for determining a cycling period based at least in part on the two or more SRS resource indicators.

In some examples of the method, apparatus, and non-transitory computer-readable medium described above, the plurality of repetitions of the uplink data signal may be transmitted in transmission opportunities following resources indicated by the two or more SRS resource indicators.

In some examples, of the method, apparatus, and non-transitory computer-readable medium described above the at least one SRS resource indicator may be a single SRS resource indicator. Some examples of the method, apparatus, and non-transitory computer-readable medium described above may further include processes, features, means, or instructions for identifying a set of additional SRS resource indicators based at least in part on the single SRS resource indicator.

In some examples of the method, apparatus, and non-transitory computer-readable medium described above, the DCI may include an index corresponding to the transmission beam cycling scheme.

Some examples of the method, apparatus, and non-transitory computer-readable medium described above may further include processes, features, means, or instructions for receiving a set of beam cycling schemes, each beam cycling scheme having a corresponding index.

Some examples of the method, apparatus, and non-transitory computer-readable medium described above may further include processes, features, means, or instructions for determining the beam cycling scheme based at least in part on the index.

A method of wireless communication is described. The method may include transmitting downlink control information (DCI) indicating that an uplink data signal is to be transmitted using two or more transmission beams during different transmission time intervals (TTIs) and an indication of at least one SRS resource indicator, determining, based at least in part on the at least one SRS resource indicator, a beam cycling scheme for the uplink data signal, and receiving a plurality of repetitions of the uplink data signal, where each repetition is received on a different TTI using a different one of the two or more transmission beams based at least in part on the beam cycling scheme.

An apparatus for wireless communication is described. The apparatus may include means for transmitting downlink control information (DCI) indicating that an uplink data signal is to be transmitted using two or more transmission beams during different transmission time intervals (TTIs) and an indication of at least one SRS resource indicator, means for determining, based at least in part on the at least one SRS resource indicator, a beam cycling scheme for the uplink data signal, and means for receiving a plurality of repetitions of the uplink data signal, where each repetition is received on a different TTI using a different one of the two or more transmission beams based at least in part on the beam cycling scheme.

Another apparatus for wireless communication is described. The apparatus may include a processor, memory coupled with the processor, and instructions stored in the memory. The instructions may be operable to cause the processor to transmit downlink control information (DCI) indicating that an uplink data signal is to be transmitted using two or more transmission beams during different transmission time intervals (TTIs) and an indication of at least one SRS resource indicator, determine, based at least in part on the at least one SRS resource indicator, a beam cycling scheme for the uplink data signal, and receive a plurality of repetitions of the uplink data signal, where each repetition is received on a different TTI using a different one of the two or more transmission beams based at least in part on the beam cycling scheme.

A non-transitory computer-readable medium for wireless communication is described. The non-transitory computer-readable medium may include instructions operable to cause a processor to transmit downlink control information (DCI) indicating that an uplink data signal is to be transmitted using two or more transmission beams during different transmission time intervals (TTIs) and an indication of at least one SRS resource indicator, determine, based at least in part on the at least one SRS resource indicator, a beam cycling scheme for the uplink data signal, and receive a plurality of repetitions of the uplink data signal, where each repetition is received on a different TTI using a different one of the two or more transmission beams based at least in part on the beam cycling scheme.

In some examples of the method, apparatus, and non-transitory computer-readable medium described above, the indication of the at least one SRS resource indicator may include two or more SRS resource indicators.

In some examples of the method, apparatus, and non-transitory computer-readable medium described above, the indication of the at least one SRS resource indicator may include a single SRS resource indicator.

In some examples of the method, apparatus, and non-transitory computer-readable medium described above, the indication of the at least one SRS resource indicator may include an index corresponding to the beam cycling scheme.

Some examples of the method, apparatus, and non-transitory computer-readable medium described above may further include processes, features, means, or instructions for transmitting a set of beam cycling schemes, each beam cycling scheme having a corresponding index.

A method of wireless communication is described. The method may include receiving a grant indicating resources for an uplink data transmission, determining a default beam cycling scheme for uplink control signals, determining, based at least in part on the default beam cycling scheme for a control channel, a beam cycling scheme for the uplink data transmission, and transmitting a plurality of repetitions of the uplink data signal, where each repetition is transmitted on a different transmission time interval (TTI) using a different one of two or more transmission beams based at least in part on the determined beam cycling scheme for the uplink data transmission.

An apparatus for wireless communication is described. The apparatus may include means for receiving a grant indicating resources for an uplink data transmission, means for determining a default beam cycling scheme for uplink control signals, means for determining, based at least in part on the default beam cycling scheme for a control channel, a beam cycling scheme for the uplink data transmission, and means for transmitting a plurality of repetitions of the uplink data signal, where each repetition is transmitted on a different transmission time interval (TTI) using a different one of two or more transmission beams based at least in part on the determined beam cycling scheme for the uplink data transmission.

Another apparatus for wireless communication is described. The apparatus may include a processor, memory coupled with the processor, and instructions stored in the memory. The instructions may be operable to cause the processor to receive a grant indicating resources for an uplink data transmission, determine a default beam cycling scheme for uplink control signals, determine, based at least in part on the default beam cycling scheme for a control channel, a beam cycling scheme for the uplink data transmission, and transmit a plurality of repetitions of the uplink data signal, where each repetition is transmitted on a different transmission time interval (TTI) using a different one of two or more transmission beams based at least in part on the determined beam cycling scheme for the uplink data transmission.

A non-transitory computer-readable medium for wireless communication is described. The non-transitory computer-readable medium may include instructions operable to cause a processor to receive a grant indicating resources for an uplink data transmission, determine a default beam cycling scheme for uplink control signals, determine, based at least in part on the default beam cycling scheme for a control channel, a beam cycling scheme for the uplink data transmission, and transmit a plurality of repetitions of the uplink data signal, where each repetition is transmitted on a different transmission time interval (TTI) using a different one of two or more transmission beams based at least in part on the determined beam cycling scheme for the uplink data transmission.

Some examples of the method, apparatus, and non-transitory computer-readable medium described above may further include processes, features, means, or instructions for identifying the configuration may include identifying a default beam for a physical uplink shared channel associated with the uplink data transmission. In some examples of the method, apparatus, and non-transitory computer-readable medium described above, the default beam cycling scheme for the control channel may be based at least in part on the default beam for the physical uplink shared channel.

In some examples of the method, apparatus, and non-transitory computer-readable medium described above, the control channel may include one or more of an uplink control channel or a downlink control channel.

DETAILED DESCRIPTION

Multi-beam communication may improve reliability of communication. For example, use of multi-beam communication provides robustness against blocking due to beam diversity. In some cases, uplink multi-beam operation may involve a user equipment (UE) transmitting repetitions of uplink signals using different transmission beams during different transmission time intervals (TTIs).

In some examples, a base station may transmit a downlink control signal, such as a radio resource control signal (RRC) or a physical downlink control channel (PDCCH) transmission containing a downlink control information block, to the UE to enable multi-beam operation. The downlink control signal may indicate that an uplink control signal is to be transmitted in different TTIs using different transmission beams. In some examples, the downlink control signal may include a beam cycling information element (IE) indicating which resources (e.g., TTIs) are to be used for multi-beam operation. The UE may transmit repetitions of the uplink control signal during the indicated resources. The UE may determine the transmission beams to be used during each resource based at least in part on an order of spatial relation IEs in the downlink control signal, subsequent signals received from the base station (e.g., a medium access control control element MAC-CE)), or a combination thereof. In some other examples, the downlink control signal may be an uplink grant. The uplink grant may indicate the resources (e.g., time and frequency resources) to be used for multi-beam operations, and may also identify one or more transmission beams to be used for transmission during the resources.

In some examples, a UE may determine a beam cycling scheme, and may transmit repetitions of an uplink data signal using different transmission beams during different TTIs based at least in part on the beam cycling scheme. The UE may determine the beam cycling scheme based at least in part on one or more sounding reference signal (SRS) resource indicators received from the base station. In some other examples, the UE may determine the beam cycling scheme based at least in part on a default beam cycling scheme, which may be a beam cycling scheme associated with a default uplink data beam, an uplink control beam, or a downlink beam.

Aspects of the disclosure are initially described in the context of a wireless communications system. Aspects of the disclosure are further illustrated by and described with reference to apparatus diagrams, system diagrams, and flowcharts that relate to uplink multi-beam operation.

Figure 1:
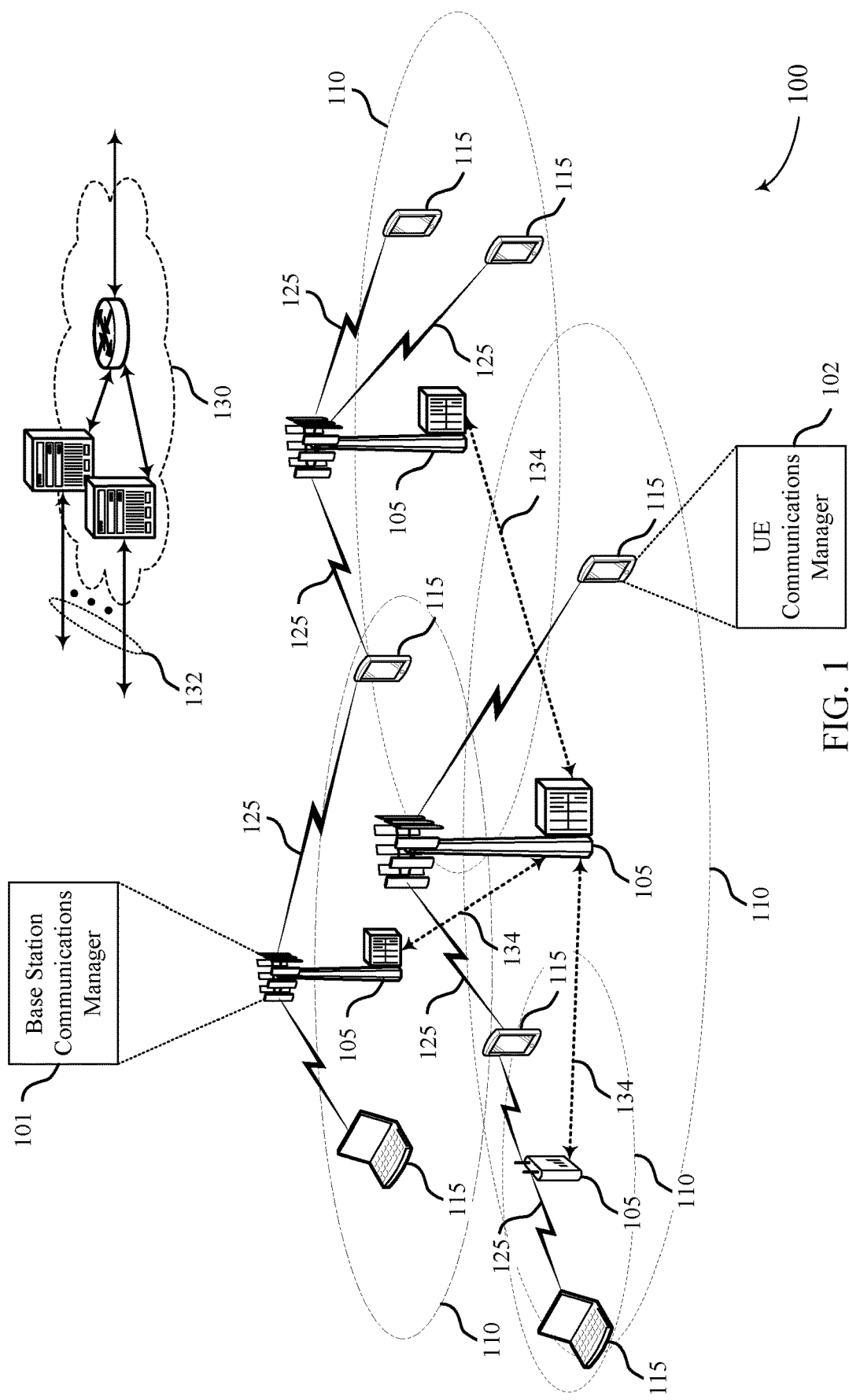
FIG. 1 illustrates an example of a system for wireless communication that supports uplink multi-beam operation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing multi-carrier modulation (MCM) techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a base station communications manager 101, which may enable multi-beam uplink operation. The base station communications manager 101 may enable multi-beam uplink operation by causing the base station 105 to transmit one or more downlink control messages.

In some examples, the base station communications manager 101 may enable multi-beam uplink operation over an uplink control channel such as a physical uplink control channel (PUCCH).

In some examples, the base station communications manager 101 may generate an RRC message or signal which may include a list of spatial relation information elements (IEs) and a list of resource IEs. The RRC signal may include a beam cycling IE, which may be an inter-slot, intra-slot, or inter-TTI beam cycling IE or the like (where the TTI may be, for example, a mini-slot, a slot, or multiple slots). The base station communications manager 101 may cause the base station 105 to transmit the RRC signal to a UE 115.

The base station communications manager 101 may generate a medium access control (MAC) control element (CE). The MAC-CE may link resource IEs to be used for multi-beam transmission into the list of spatial relation IEs. The spatial relation IEs may be listed in the order in which beams are to be cycled through. The base station communications manager 101 may cause the base station 105 to transmit the MAC-CE to a UE 115.

In some other examples, the base station communications manager 101 may generate an uplink grant. The uplink grant may identify two or more resources (e.g., transmission time intervals (TTIs)) to be used for multi-beam operation, and for each such resource may identify a transmission beam to be used. The base station communications manager 101 may cause the base station 105 to transmit the uplink grant to the UE 115.

In some examples, the base station communications manager 101 may enable multi-beam uplink operation over an uplink data channel such as a physical uplink shared channel (PUSCH). In some examples, a single beam operation with beam switching via SRS indicator for different packets or for different HARQ repetitions of a given packet may also provide beam diversity. In such cases, if a link degradation is detected, the base station communications manager 101 may configure PUSCH repetitions and add beam hopping if two independent comparable-strength beams are identified. Such PUSCH repetitions and beam hopping configuration may be helpful in the examples of ultra-reliable low latency communications where a higher reliability without waiting for HARQ round-trip time may be needed.

In some examples, the base station communications manager 101 may generate downlink control information (DCI). The DCI may include an indication of a sounding reference signal (SRS) resource indicator. The indication of the SRS resource indicator may be, for example, two or more SRS resource indicators. In other examples, the indication of the SRS resource indicator may be a single SRS resource indicator. In some other examples, the indication of the SRS resource indicator may be an index corresponding to an SRS resource indicator pattern. In such examples, the base station communications manager 101 may have previously caused the base station 105 to transmit a plurality of SRS resource indicator patterns, along with the corresponding indices, to the UE 115. The base station communications manager 101 may cause the base station 105 to transmit the DCI to the UE 115.

UEs 115 may include a UE communications manager 102, which may transmit repetitions of an uplink signal over an uplink channel in different TTIs using different transmission beams. The UE communications manager 102 may transmit the repetitions of an uplink signal based at least in part on a beam cycling scheme, which may be determined based at least in part on a downlink signal received from a base station 105.

The uplink channel may be an uplink control channel such as a PUCCH. The UE communications manager 102 may receive a downlink control signal from the base station 105, and may determine the beam cycling scheme based at least in part on the downlink control signal.

In some examples, the downlink control signal may be an RRC signal. The UE communications manager 102 may determine the beam cycling scheme based at least in part on the RRC signal. In some examples, the UE communications manager 102 may also determine the beam cycling scheme based at least in part on a MAC-CE received from the base station 105. In some other examples, the UE communications manager 102 may determine the beam cycling scheme based at least in part on an order of the spatial relation IEs in the RRC signal.

In some examples, the downlink control signal may be an uplink grant. The UE communications manager 102 may determine the beam cycling scheme based at least in part on the uplink grant.

The UE communications manager 102 may cause the UE 115 to transmit repetitions of the uplink control signal over the uplink control channel in different TTIs using different transmission beams based at least in part on the beam cycling scheme.

In some other examples, the uplink channel may be an uplink control channel such as a PUSCH. The UE communications manager 102 may identify one or more beams to follow in implementing the beam cycling.

In some examples, the UE communications manager 102 may receive DCI from the base station 105. The DCI may include an indication of one or more SRS resource indicators. The UE communications manager 102 may implement the beam cycling scheme based at least in part on the indicated SRS resource indicators.

In some examples, the DCI may include two or more SRS resource indicators. The UE communications manager 102 may follow the beam of the indicated SRS resources. In some other examples, the DCI may include a single SRS resource indicators. The UE communications manager 102 may identify additional SRS resources based at least in part on the single SRS resource indicators. The UE communications manager 102 may follow the beam of the single indicated SRS resource and the additional SRS resources. In some other examples, the DCI may include an index corresponding to an SRS resource indicator pattern. The UE communications manager 102 may determine the SRS resource indicator pattern based at least in part on the received index. The UE communications manager may implement beam cycling based at least in part on the SRS resource indicator pattern.

In some examples, the UE communications manager 102 may receive an uplink grant from the base station 105. The UE communications manager 102 may identify a default multi-beam configuration for transmissions according to the grant. In some examples, the default multi-beam configuration may be a default PUSCH configuration. In some examples, the default multi-beam configuration may be a PUCCH configuration. In some examples, the default multi-beam configuration may be a downlink configuration. The UE communications manager 102 may determine a beam cycling scheme based at least in part on the default multi-beam configuration. For example, the default multi-beam configuration may be a default beam cycling scheme, and the default beam cycling scheme may be used as the beam cycling scheme for transmission of uplink signals. In some other examples, the default beam cycling scheme may be modified, e.g., based on differences between the uplink data channel and the channel associated with the default configuration.

The UE communications manager 102 may cause the UE 115 to transmit repetitions of the uplink data signals over the uplink data channel using different transmission beams in different TTIs based on the beam cycling scheme identified by the UE communications manager 102.

Figure 2:
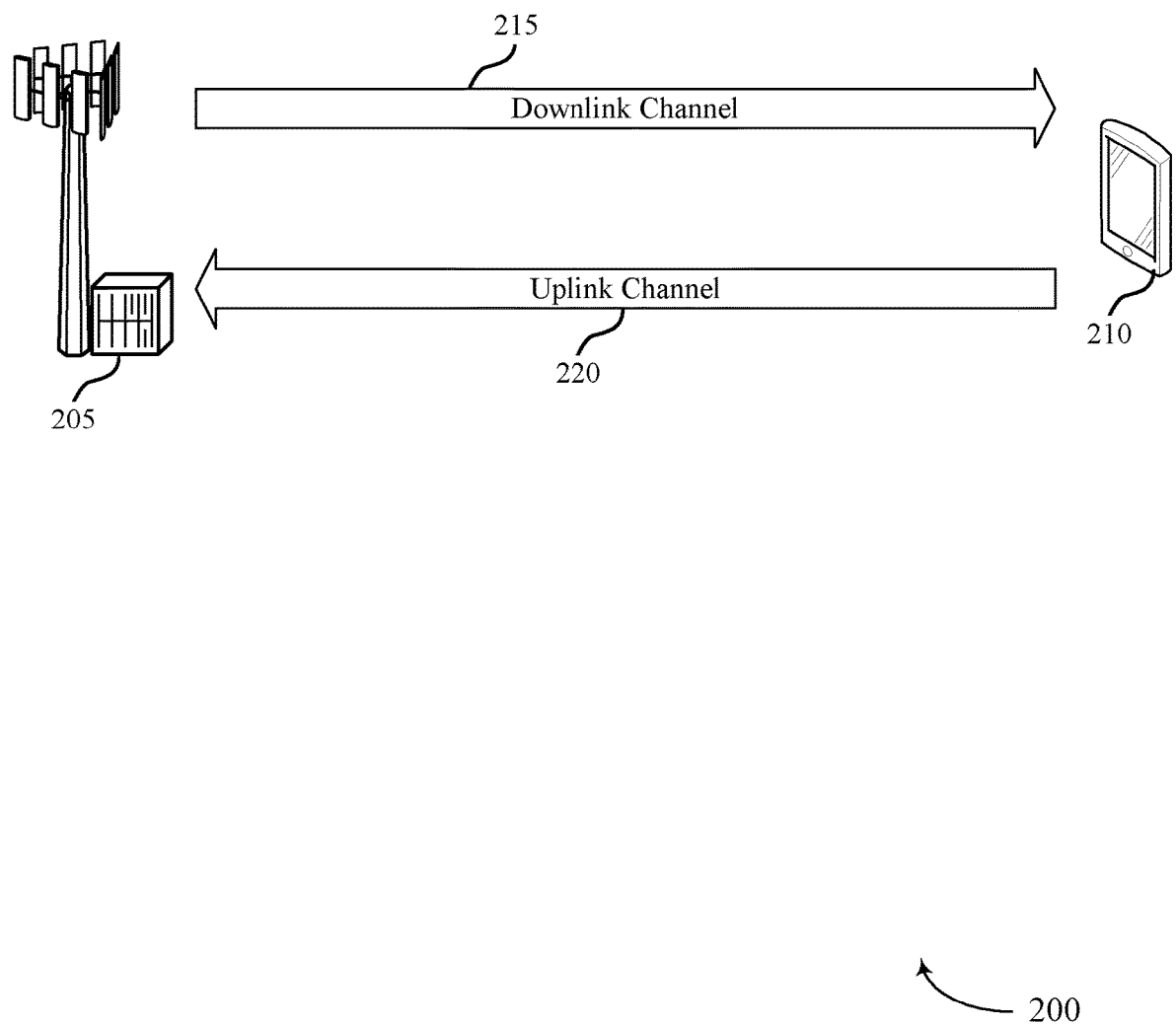
FIG. 2 illustrates an example of a wireless communications system that supports uplink multi-beam operation in accordance with aspects of the present disclosure.

FIG. 2 illustrates an example of a wireless communications system 200 that supports uplink multi-beam operation in accordance with various aspects of the present disclosure. In some examples, wireless communications system 200 may implement aspects of wireless communications system 100.

The wireless communications system 200 may include a base station 205 and a UE 210. The base station 205 may be an example of aspects of base station 105 described with reference to FIG. 1. The UE 210 may be an example of aspects of UE 115 described with reference to FIG. 1. The UE 210 may be capable of transmitting using a plurality of transmission beams.

The base station 205 may transmit information to the UE 210 over a downlink channel 215, and may receive information from the UE 210 over an uplink channel 220. In order to enable multi-beam operation over the uplink channel 220, the base station 205 may transmit a downlink signal over the downlink channel 215. The downlink signal may indicate that an uplink signal is to be transmitted using two or more of the plurality of transmission beams over the uplink channel 220.

In some examples, the uplink channel 220 may be an uplink control channel such as a physical uplink control channel (PUCCH). The base station 205 may enable multi-beam operation over the uplink control channel by transmitting a downlink control signal indicating that an uplink control signal is to be transmitted using two or more transmission beams during different transmission time intervals (TTIs). The TTIs may be, for example, a slot, a mini-slot, or the like. In such examples, the base station 205 may configure the uplink transmission repetitions using different beams if, e.g., the repetitions may increase coverage, or a beam hopping configuration may provide additional robustness when two different beams with similar strengths are identified.

In some examples, the downlink control signal may be a radio resource control (RRC) signal. The RRC signal may include a list of spatial relation information elements (IEs) and a list of resource IEs. Each spatial relation IE may indicate a transmission beam. For example, a spatial relation IE may include a synchronization signal block (SSB) beam index, a non-zero-power (NZP) channel state information reference signal (CSI-RS), a sounding reference signal (SRS) resource. Each spatial relation IE may also include power control parameters associated with the indicated transmission beam. The power control parameters may include, e.g., a downlink pathloss reference, a closed-loop index, a PO index, or a combination thereof. Each resource IE may indicate a TTI or a set of resources to be used for an uplink transmission. For example, each resource IE may include an indication of a starting resource block (RB), an indication of whether frequency hopping within a transmission time interval (TTI) is enabled, an indication of a second hop physical RB (PRB), and resource-specific parameters, e.g., symbol numbers, start symbol, initial cyclic shift (e.g., for PUCCH formats 0 and 1), PRB numbers (e.g., for PUCCH formats 2 and 3), orthogonal cover code index (e.g., for PUCCH formats 1 and 4).

The RRC signal may also include a beam cycling IE. The beam cycling IE may be an inter-TTI beam cycling IE such as an inter-slot beam cycling IE. The beam cycling IE may include a number of beams to be cycled through. In some examples, a beam cycling IE may be included with each resource IE (e.g., by including in the resource IE an index corresponding to the number of beams to be cycled through). In some other examples, a beam cycling IE may correspond to a format of the resources, such that the beam cycling IE applies to all resource IEs having the corresponding format.

The base station 205 may also transmit a medium access control (MAC) control element (CE) to the UE 210 over the downlink channel 215. The MAC-CE may indicate which transmission beams are to be used for transmission during indicated TTIs. For uplink control signals that are to be transmitted once, the MAC-CE may associate a resource IE with a spatial relation IE.

For multi-beam operation, the MAC-CE may associate resource IEs having an index greater than or equal to one with a list of spatial relation IEs. The spatial relation IEs may be listed in an order in which the transmission beams are to be cycled through with slot repetition. The size of the MAC-CE may vary based on the number of beams to be cycled through, the number of repeated TTIs, or a combination thereof. Alternatively, padding bits may be used as needed to ensure that the final MAC-CE size after padding is independent of these variations.

The UE 210 may receive the RRC signal and the MAC-CE, and may determine parameters for multi-beam operation based thereupon. For example, the UE 210 may identify the TTIs to be used for transmitting repetitions of an uplink control signal, and the transmission beams to be used during each TTI, based at least in part on the RRC signal, the MAC-CE, or a combination thereof. The UE 210 may transmit repetitions of the uplink control signal over the 220 using the identified combinations of TTIs and transmission beams.

The UE 210 may also determine power control parameters to be used during each TTI. In some examples, the UE 210 may determine power control parameters to be used for transmission during an initial TTI, and may apply those power control parameters during the subsequent TTIs. In some examples, the UE 210 may determine power control parameters for a TTI based at least in part on the spatial relation IE corresponding to the transmission beam to be used for that TTI. In some examples, the UE 210 may determine a first power control parameter (e.g., PO and/or closed-loop index) for a first TTI based at least in part on the power control parameter in a previous TTI and may determine a second power control parameter (e.g., downlink pathloss reference) for the first TTI based at least in part on the spatial relation IE corresponding to the first TTI.

In some examples, the UE 210 may skip one or more of the TTIs identified for multi-beam transmission (e.g., because there are insufficient uplink symbols in the uplink/downlink configuration). In some examples, the UE 210 may perform beam cycling based at least in part on the transmitted TTI count. In such examples, the UE 210 may cycle through the identified beams for TTIs in which the UE 210 transmits. In some other examples, the UE 210 may perform beam cycling based at least in part on the absolute TTI index. In such examples, the UE 210 may skip one or more transmission beams.

In some examples, the UE 210 may perform beam cycling by cycling through each transmission beam individually. In some other examples, the UE 210 may perform beam cycling on a per-N-Slot basis, where N is an integer. In such examples, the UE 210 may transmit repetitions of the uplink control signal using a first transmission beam in a first set of N TTIs, transmit repetitions of the uplink control signal using a second transmission beam in a second set of N TTIs, and so forth.

The base station 205 and/or UE 210 may not support MAC-CE updates. In some examples, multi-beam uplink operation may not be supported. In some other examples, the UE 210 may implement multi-beam uplink operation without the MAC-CE. For example, the UE 210 may identify the TTIs to be used for multi-beam operation based at least in part on the RRC signal. The UE 210 may identify the transmission beams to be used during each of the identified TTIs by cycling through the transmission beams in the order of the listed spatial relation IEs.

In some examples, the downlink control signal may be an uplink grant for the uplink control signal. For example, the uplink grant may be a PUCCH grant transmitted in downlink control information (DCI).

The uplink grant may include an indication of two or more sets of uplink resources that may be used for transmitting repetitions of an uplink control signal. The indication of two or more sets of uplink resource may be, for example, a set of acknowledgement resource indicators (ARIs). The uplink grant may also include an indication of a transmission beam to be used for each set of uplink resources. The indication of the transmission beam may be, for example, a k1 value. In some examples, the uplink grant may include transmission parameters (e.g., power control parameters) for one or more of the sets of uplink resources.

The base station 205 may transmit the uplink grant to the UE 210 over the downlink channel 215. The UE 210 may identify two or more TTIs for multi-beam operation based at least in part on the uplink grant. For example, the UE 210 may identify the two or more TTIs based at least in part on the indication of the two or more sets of uplink resources. The UE 210 may identify a transmission beam to be used during each of the identified TTIs. In some examples, the uplink grant may include an identifier associated with a transmission beam for each TTI, and the UE 210 may identify the transmission beam based at least in part on the corresponding identifier for a TTI. In some other examples, the uplink grant may include an identifier associated with a transmission beam for a first TTI, and the UE 210 may identify the transmission beams for other TTIs based at least in part on the identifier for the first TTI. The UE 210 may transmit repetitions of the uplink control signal over the 220 using the identified combinations of TTIs and transmission beams.

In some other examples, the uplink channel 220 may be an uplink data channel such as a physical uplink shared channel (PUSCH).

In some examples, the base station 205 may transmit downlink control information (DCI) indicating that an uplink data signal is to be transmitted using two or more transmission beams during different TTIs. The DCI may also include an indication of at least one sounding reference signal (SRS) resource indicator SRI. Multi-beam operation over the PUSCH may follow the beam(s) of the SRS resource(s) indicated by the at least one SRS resource indicator. The SRS resource indicators may also index into lists of power control parameters such as downlink pathloss reference, PO (e.g., a target received power), alpha (e.g., a pathloss compensation factor), closed-loop index, and the like. In such cases, once two SRIs are associated with PUSCH, the power-control parameters of one SRI may be reused.

In some examples, the indication of at least one SRS resource indicator may be multiple SRS resource indicators. The transmission of repetitions of the uplink data signal may follow the beams of the multiple SRS resource indicators. In some examples, the beam cycling period may be pre-configured. In some other examples, the beam cycling period may be determined based at least in part on the multiple SRS resource indicators.

In some examples, the indication of at least one SRS resource indicator may be a single SRS resource indicator. The UE 210 may determine additional SRS resource indicators to be used for beam cycling based at least in part on the single SRS resource indicator. In some examples, the UE 210 may determine additional SRS resource indicators based on a list of subsequent SRS resource indicators (e.g., may determine additional SRS resource indicators SRI+1, SRI+2, etc. based on receipt of the SRS resource indicator SRI). In some other examples, the UE 210 may downselect SRS resource indicators based at least in part on the single SRS resource indicator. In some examples, the UE 210 may downselect among the SRIs corresponding to an SRS that was actually transmitted in a number of consecutive slots or TTIs associated with (e.g., beginning at) the slot or TTI to which the first SRS is referring. In such cases, the UE 210 may skip over certain slots or TTIs when determining the number of consecutive slots or TTIs (e.g., treat downlink-only slot or TTI as not breaking the 'consecutiveness').

In some examples, the base station 205 may transmit a set of SRS resource indicator patterns to the UE 210. Each SRS resource indicator pattern in the set of SRS resource indicator patterns may include a corresponding index. The indication of at least one SRS resource indicator may be an index corresponding to one of the SRS resource indicator patterns. The UE 210 may select the SRS resource indicator pattern corresponding to the resource and may follow the beams of the SRS resource indicators identified in the SRS resource indicator pattern. In some examples, a DCI may carry an index into a set of SRI or beam cycling patterns, instead of an SRI. In such cases, there may be a tradeoff between flexibility and DCI overhead based at least in part on a number of defined patterns, and these patterns may be updated by an RRC signal or a MAC-CE. In some examples, an SRI may be present even if an SRS is not configured, and the SRI may be directly interpreted as an index into a list of beams, e.g., a list of PUCCH beams, a PUCCH spatial relationship IE, etc. In some examples in which an SRS and/or an SRI may be absent or undefined, a PUCCH-based default beam may be used, following the approach used for PUCCH. The PUCH-based default beam may be applied to semi-persistent scheduling or grant-free cases.

In some other examples, the UE 210 may perform beam cycling following a default beam. The default beam may be, for example, a default uplink data beam, an uplink control beam, or a downlink beam.

The base station 205 may transmit an uplink grant to the UE 210. The uplink grant may indicate resources that the UE 210 may use for uplink data transmissions.

The base station 205 may determine a default beam cycling scheme. In some examples, the default beam cycling scheme may be a default beam cycling scheme associated with the uplink data channel (e.g., PUSCH). In some other examples, the default beam cycling scheme may be a beam cycling scheme associated with an uplink control channel (e.g., PUCCH). In some other examples, the default beam cycling scheme may be a beam cycling scheme associated with a downlink channel. In such cases, the default beam cycling may follow a PDCCH multi-beam configuration, if any, or be associated with multiple PDCCH beams. In these cases, power-control parameters may still be based on the default PUCCH beam and follow approaches used for PUCCH multi-beam power-control.

The UE 210 may then determine a beam cycling scheme for uplink data transmissions based at least in part on the default beam cycling scheme. In some examples, the beam cycling scheme may be the default beam cycling scheme. In some other examples, the UE 210 may modify the default beam cycling scheme. For example, the default beam cycling scheme may be a beam cycling scheme associated with a PUCCH beam. The PUCCH beam may use per-N-TTI cycling, where N is an integer. However, the PUCCH beam and the PUSCH beam may have different repetition factors. Accordingly, the UE 210 may adjust the N value based on the PUSCH repetition factor. The UE 210 may then transmit repetitions of the uplink data signal based at least in part on the determined beam cycling scheme. In some examples, the UE 210 may use the same N, and a number of cycles may differ based on the repetition factor.

In some examples, the base station 205 may define multiple fixed PUCCH resources to indicate multiple default PUSCH beams. The UE 210 may cycle through the multiple default PUSCH beams in repeated PUSCH TTIs. In some examples, the multiple default PUSCH beams may be updated based at least in part on MAC-CE updates, e.g., as in all PUCCH beams. Such MAC-CE updatable PUSCH beams may allow multi-beam PUSCH even if the PUCCH may not be multi-beam.

Figure 3:
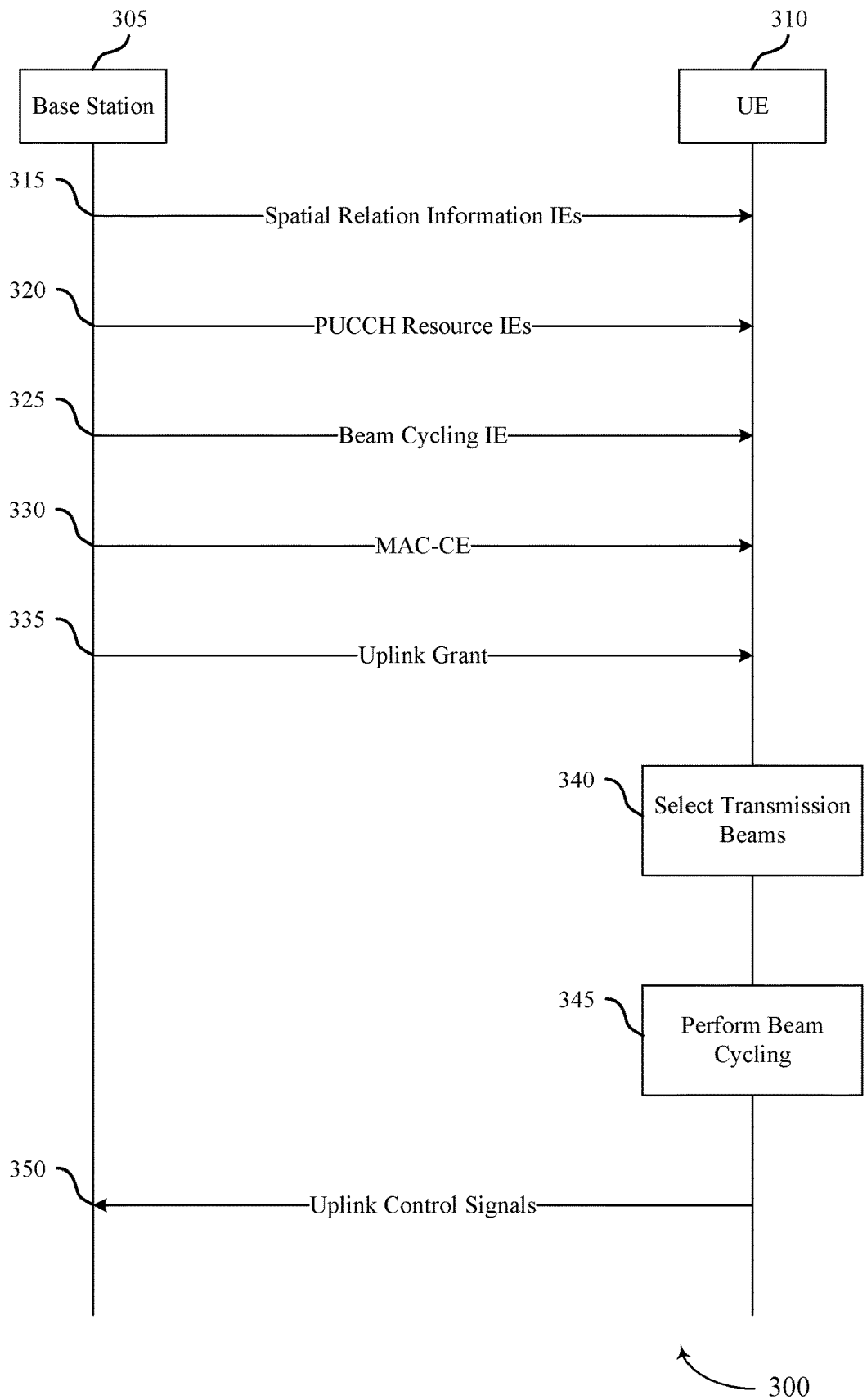
FIG. 3 illustrates an example of a communications flow in a wireless communications system that supports uplink multi-beam operation in accordance with aspects of the present disclosure.

FIG. 3 illustrates an example of a communications flow 300 in a wireless communications system that supports uplink multi-beam operation in accordance with various aspects of the present disclosure. In some examples, the wireless communications system may implement aspects of wireless communications system 100.

The communications flow 300 shows communications between a base station 305 and a UE 310. The base station 305 and the UE 310 may be examples of aspects of base station 105 and UE 115, respectively, as described with reference to FIG. 1.

The base station 305 may transmit a list of spatial relation information elements (IEs) 315 to the UE 310. The spatial relation IEs 315 may be physical uplink control channel (PUCCH) spatial relation information IEs. The spatial relation IEs 315 may be transmitted in radio resource control (RRC) signaling. Each spatial relation IE 315 may indicate a transmission beam. For example, the spatial relation IE 315 may include a synchronization signal block (SSB) beam index, a non-zero-power (NZP) channel state information reference signal (CSI-RS), a sounding reference signal (SRS) resource. The spatial relation IEs 315 may also include power control parameters associated with the indicated transmission beam. The power control parameters may include, e.g., a downlink pathloss reference, a closed-loop index, a PO index, or a combination thereof. In some examples, once two PUCCH spatial relation information configuration for each PUCCH resource are associated, each beam may get its own power-control parameters.

The base station 305 may transmit a list of resource IEs 320 to the UE 310. The resource IEs 320 may be PUCCH resources IEs. The resources IEs 320 may be transmitted in RRC signaling. Each resource IE 320 may indicate a resource that may be used for an uplink control transmission. For example, the resource IE 320 may include an indication of a starting resource block (RB), an indication of whether frequency hopping within a transmission time interval (TTI) is enabled, an indication of a second hop physical RB (PRB), and resource-specific parameters. The resource-specific parameters may include a number of symbols, a start symbol, an initial cycling shift, a number of PRBs, orthogonal cover codes (OCC), or a combination thereof. The list of resource IEs 320 may also include a separate format configuration IE for each format, which may include parameters that are common to all resources associated with that format. Such parameters may include TTI repetition, frequency hopping between TTIs, additional demodulation reference signals, π/2-shift binary phase shift keying (BPSK), or the like.

The base station 305 may transmit a beam cycling IE 325. The beam cycling IE 325 may be an inter-TTI beam cycling IE such as an inter-slot beam cycling IE. However, other TTIs may also be used. For example, the TTI may be a mini-slot. The beam cycling IE 325 may indicate that an uplink control signal is to be transmitted using two or more transmission beams during different TTIs. In some examples, the beam cycling IE 325 may be transmitted only when an uplink control signal is to be transmitted in more than one TTI. In some examples, the beam cycling IE 325 may indicate a number of transmission beams to be used to transmit the uplink control signal during the two or more TTIs.

In some examples, the beam cycling IE 325 may be transmitted in RRC signaling. In some examples, the beam cycling IE 325 may be transmitted with the spatial relation IEs 315 and/or the resource IEs 320. For example, a beam cycling IE 325 may be associated with each resource IE 320. In some other examples, a beam cycling IE 325 may be included in the format configuration IE.

In some cases, the base station 305 may transmit a medium access control (MAC) control element (CE) 330 to the UE 310. The MAC-CE 330 associates resource IEs 320 with spatial relation IEs 315. The MAC-CE 330 may link each resource IE 320 having an index of greater than or equal to one (i.e., each resource IE 320 having an associated beam cycling IE 325) to one or more of the spatial relation IEs 315. For example, the MAC-CE 330 may associate a list of the resource IEs 320 having an index greater than or equal to one with a list of spatial relation IEs 315. The spatial relation IEs 315 may be listed in the MAC-CE 330 in the order in which the beams are to be cycled through with TTI repetition. The size of the MAC-CE 330 may vary based on the number of beams to be cycled through per the beam cycling IE 325, a number of repeated TTIs, or a combination thereof.

The base station 305 may transmit an uplink grant 335 to the UE 310. The uplink grant 335 may identify resources to be used for transmissions by the UE 310.

The UE 310 may select the transmission beams to be used for beam cycling at 340. The UE 310 may select the beams based at least in part on the MAC-CE 330, e.g., by selecting the beams identified in the MAC-CE 330. In some examples, the UE 310 may select the beams based at least in part on the spatial relation IEs 315, the resource IEs 320, the beam cycling IEs 325, the MAC-CE 330, and the uplink grant 335, or any combination thereof.

The UE 310 may perform beam cycling at 345. In some examples, the beam cycling may be performed based at least in part on a transmitted TTI count, such that the UE 310 cycles through the selected transmission beams in TTIs in which the UE 310 transmits. In some other examples, the beam cycling may be performed based at least in part on an absolute TTI index, such that the UE 310 cycles through the selected transmission beams in TTIs which are identified in the list of resource IEs 320, even if the UE 310 does not transmit in that TTI (e.g., because the TTI is used for downlink transmissions). In some other examples, the beam cycling can be performed on a per-N-TTI basis.

The UE 310 may transmit repetitions of an uplink control signal 350 to the base station 305. The repetitions of the uplink control signal may be transmitted TTIs corresponding to the resources IEs 320 having an index greater than or equal to one (i.e., associated with a beam cycling IE 325). The UE 310 may transmit the repetitions of the uplink control signal based at least in part on the beam cycling procedure.

The UE 310 may transmit repetitions of an uplink control signal based on one or more power parameters. In some examples, the UE 310 may determine the power control parameters for an initial TTI for transmitting the uplink control signal, and may use the power control parameters for the initial TTI for the remaining TTIs in which the UE 310 is transmitting the repetitions of the uplink control signal. In some other examples, the UE 310 may determine the power control parameters for a TTI based at least in part on the spatial relation IE 315 associated with the TTI (e.g., in the MAC-CE 330). In some examples, the UE 310 may determine a first power control parameter for a TTI based at least in part on a previous TTI (e.g., the initial TTI) and may determine a second power control parameter based at least in part on the associated spatial relation IE 315.

Figure 4:
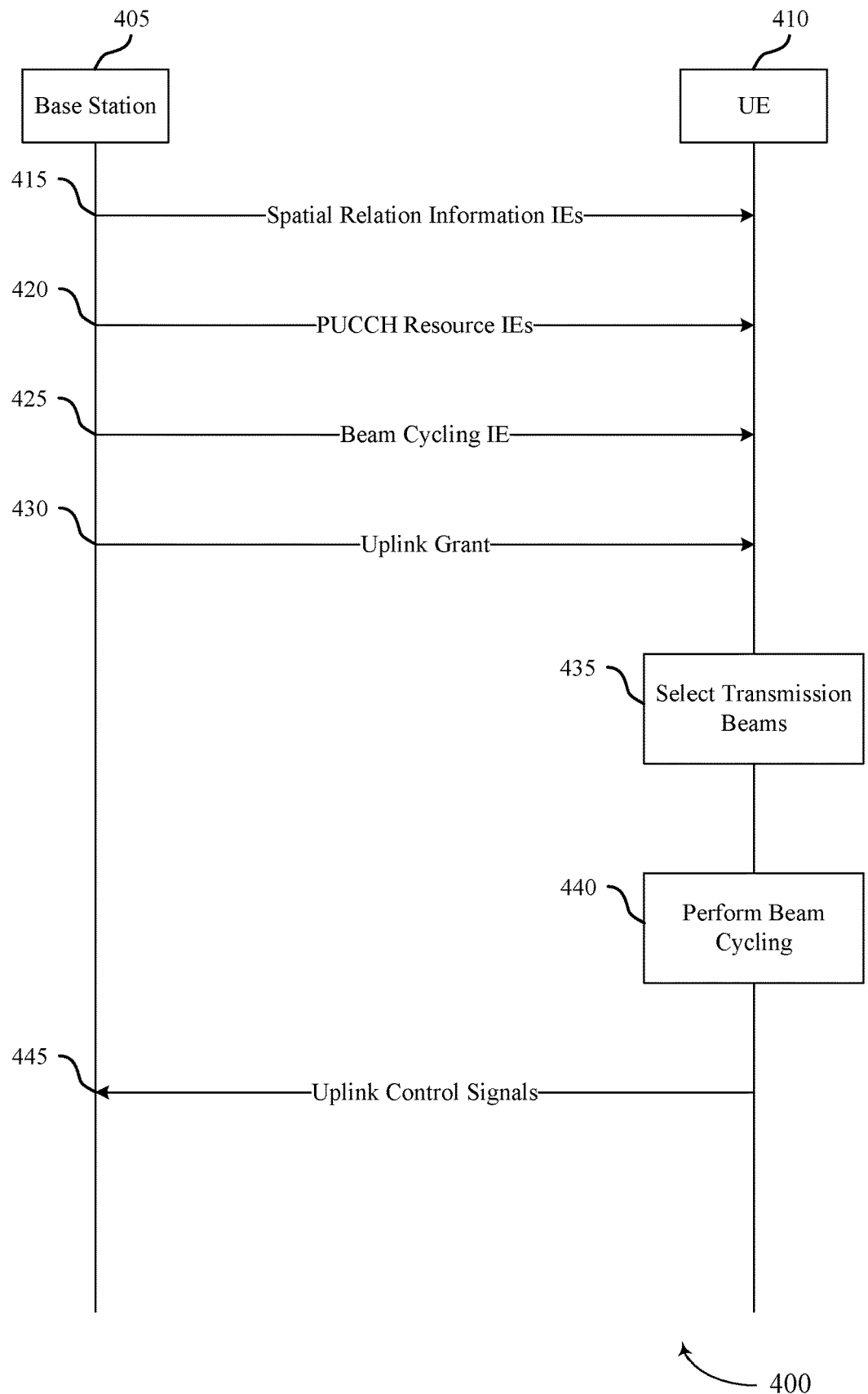
FIG. 4 illustrates an example of transmission sequences in a wireless communications system that supports uplink multi-beam operation in accordance with aspects of the present disclosure.

FIG. 4 illustrates an example of a communication flow 400 in a wireless communications system that supports uplink multi-beam operation in accordance with various aspects of the present disclosure. In some examples, the wireless communications system may implement aspects of wireless communications system 100.

The communications flow 400 shows communications between a base station 405 and a UE 410. The base station 405 and the UE 410 may be examples of aspects of base station 105 and UE 115, respectively, as described with reference to FIG. 1.

The base station 405 may transmit spatial relation IEs 415 to the UE 410. The spatial relation IEs 415 may be examples of aspects of spatial relation IEs 315 described with reference to FIG. 3.

The base station 405 may transmit resource IEs 420 to the UE 410. The resources IEs 420 may be examples of aspects of resource IEs 320 described with reference to FIG. 3.

The base station 405 may transmit a beam cycling IE 425 to the UE 410. The beam cycling IE 425 may be an example of aspects of beam cycling IE 325 as described with reference to FIG. 3.

The base station 405 may transmit an uplink grant 430 to the UE 410. The uplink grant 430 may identify resources to be used for transmissions by the UE 410.

The base station 405 may not transmit a MAC-CE to the UE 410. For example, the base station 405 and/or UE 410 may not support MAC-CE updates. In some examples, multi-beam PUCCH may not be supported when MAC-CE updates are not supported. In some other examples, the UE 410 may transmit repetitions of an uplink control signal based at least in part on the list of spatial relation IEs 415.

For example, the UE 410 may select transmission beams at 435. The UE 410 may select the transmission beams based at least in part on the list of spatial relation IEs 415. In some examples, the UE 410 may select all transmission beams indicated in the list of spatial relation IEs 415. In some other examples, the UE 410 may select the first N transmission beams indicated in the list of spatial relation IEs 415, where N is an integer. The number N may be determined based at least in part on the beam cycling IE 425 (e.g., based on an indication of the number N of beams to be cycled through in the beam cycling IE 425). In some examples, the UE 410 may select the transmission beams based at least in part on the spatial relation IEs 415, the resource IEs 420, the beam cycling IE 425, and the uplink grant 430, or any combination thereof.

The UE 410 may perform beam cycling at 440. The UE 410 may perform beam cycling using the transmission beams selected at 435. In some examples, the UE 410 may perform beam cycling using the order of the transmission beams in the list of spatial relation IEs 415.

The UE 410 may transmit repetition of the uplink control signal 445 based at least in part on the beam cycling at 440. The repetitions of the uplink control signal 445 may be transmitted as described with reference to the transmission of uplink control signals 350 in FIG. 3.

Figure 5:
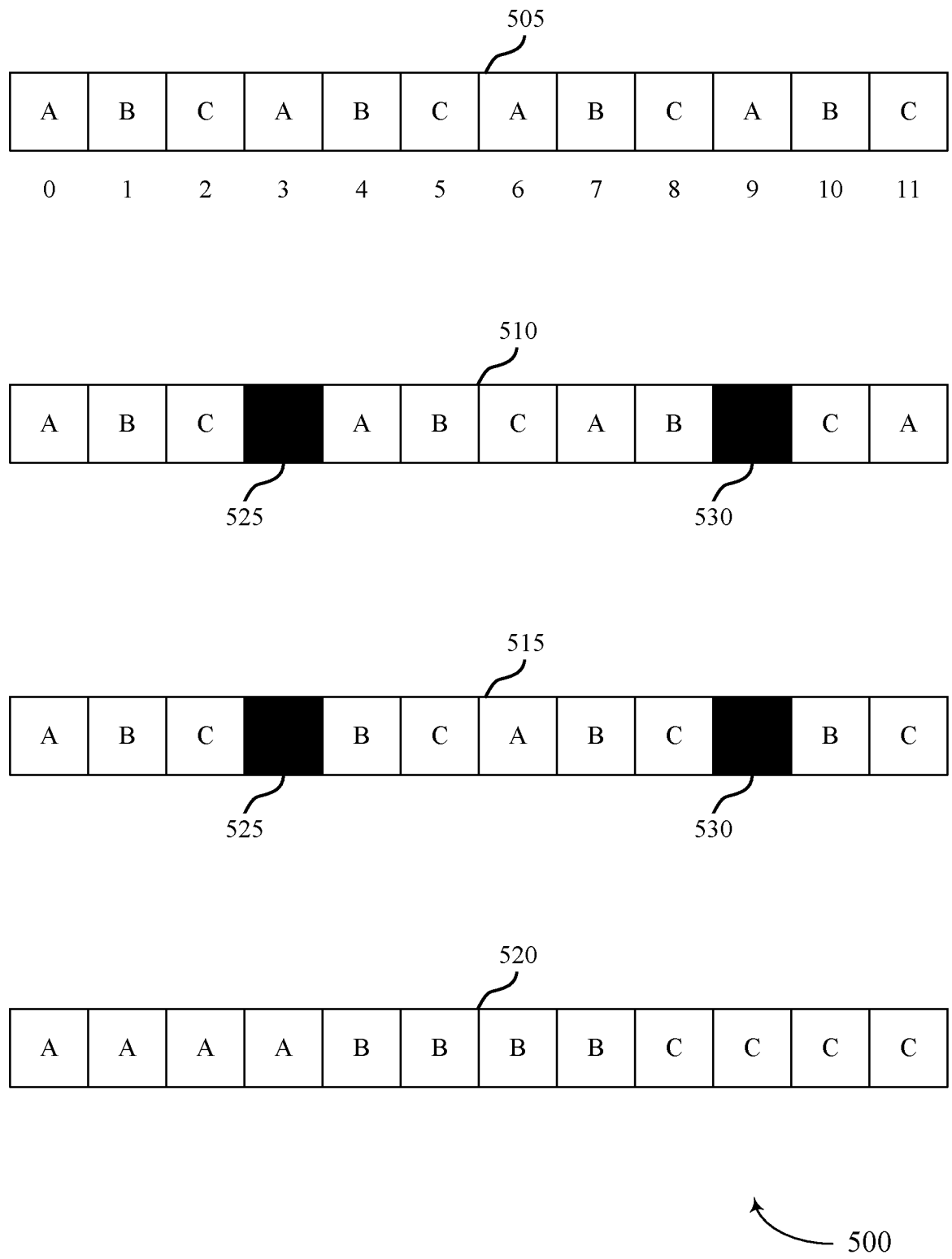
FIG. 5 illustrates an example of a communications flow in a wireless communications system that supports uplink multi-beam operation in accordance with aspects of the present disclosure.

FIG. 5 illustrates an example of beam cycling sequences 500 in a wireless communications system that supports uplink multi-beam operation in accordance with various aspects of the present disclosure. In some examples, the wireless communications system may implement aspects of wireless communications system 100.

The beam cycling sequences 500 include a first beam cycling sequence 505, a second beam cycling sequence 510, a third beam cycling sequence 515, and a fourth beam cycling sequence 520. Each beam cycling sequence uses a three transmission beam sequence. For example, a cycling beam IE may indicate that three beams are to be cycled through. These three beams are denoted by A, B, and C. Each of the beam cycling sequences 500 use twelve TTIs. For example, a MAC-CE may indicate that the twelve TTIs in the beam cycling sequences 500 are associated with the three beams A, B, and C. In some other examples, the DCI may indicate that beams A, B, and C may be used during the twelve TTIs.

The first beam cycling sequence 505 shows the use of the three transmission beams when all twelve TTIs are used for transmission. As shown in the first beam cycling sequence 505, a UE 115 may cycle through the transmission beams A, B, and C in such an example.

However, in some examples, a UE 115 may skip one or more TTIs. For example, the UE 115 may skip a TTI when there are insufficient uplink symbols in the uplink/downlink configuration. For example, the UE 115 may skip a first TTI 525 and a second TTI 530 during the second beam cycling sequence 510 and the third beam cycling sequence 515. The first TTI 525 may correspond to an index of 3, and the second TTI may correspond to an index of 9.

In some examples, the UE 115 may transmit using the transmission beams based at least in part on a transmitted TTI count. For example, in the second beam cycling sequence 510, the UE 115 may transmit using the three transmission beams A, B, and C based at least in part on the transmitted TTI count. Because the UE 115 uses three beams, the transmission is based on a modulo-3 scheme. The UE 115 transmits using beam A when the transmission count mod 3=1, transmits using beam B when the transmission count mod 3=2, and transmits using beam C when the transmission count mod 3=0.

For example, the UE 115 may transmit using beam A in the first TTI (index 0), using beam B in the second TTI (index 1), and using beam C in the third TTI (index 2). The UE 115 may skip the fourth TTI (index 3). In the fifth TTI (index 4), the transmission count is four, because a skipped TTI is not included in the transmission count. Accordingly, the UE 115 may transmit using beam A. Similarly, in the eleventh TTI (index 10), the transmission count is 9. Accordingly, the UE 115 may transmit using beam C.

In some examples, the UE 115 may transmit suing the transmission beams based at least in part on an absolute TTI index. For example, in the third beam cycling sequence 515, the UE 115 may transmit using the three transmission beams A, B, and C based at least in part on the absolute TTI index. Because the UE 115 uses three beams, the transmission is based on a modulo-3 scheme. The UE 115 transmits using beam A when the TTI index mod 3=0, transmits using beam B when the TTI index mod 3=1, and transmits using beam C when the TTI index mod 3=2.

For example, the UE 115 may transmit using beam A in the first TTI (index 0), using beam B in the second TTI (index 1), and using beam C in the third TTI (index 2). The UE 115 may skip the fourth TTI (index 3). In the fifth TTI (index 4), the TTI index is four. Accordingly, the UE 115 may transmit using beam B. In such an example, the beam A is skipped in the cycle. Similarly, in the eleventh TTI (index 10), the TTI index is ten. Accordingly, the UE 115 may transmit using beam B, and beam A may be skipped again.

In some examples, the UE 115 may transmit using the transmission beams on a per-N-slot basis, where N is an integer. In such an example, the UE 115 may determine a number N of repetitions. The number N may be configured based at least in part on a beam cycling IE and/or the spatial relation IEs. The UE 115 may then transmit using each transmission beam in N TTIs before cycling to the next transmission beam.

For example, in the fourth beam cycling sequence 520, the UE 115 may use three transmission beams A, B, and C. The UE 115 may determine that each beam should be used for four repetitions. Accordingly, the UE 115 may transmit using transmission beam A in the first set of four TTIs (indices 0-3), may transmit using transmission beam B in the second set of four TTIs (indices 4-7), and may transmit using transmission beam C in the third set of four TTIs (indices 8-11).

Figure 6:
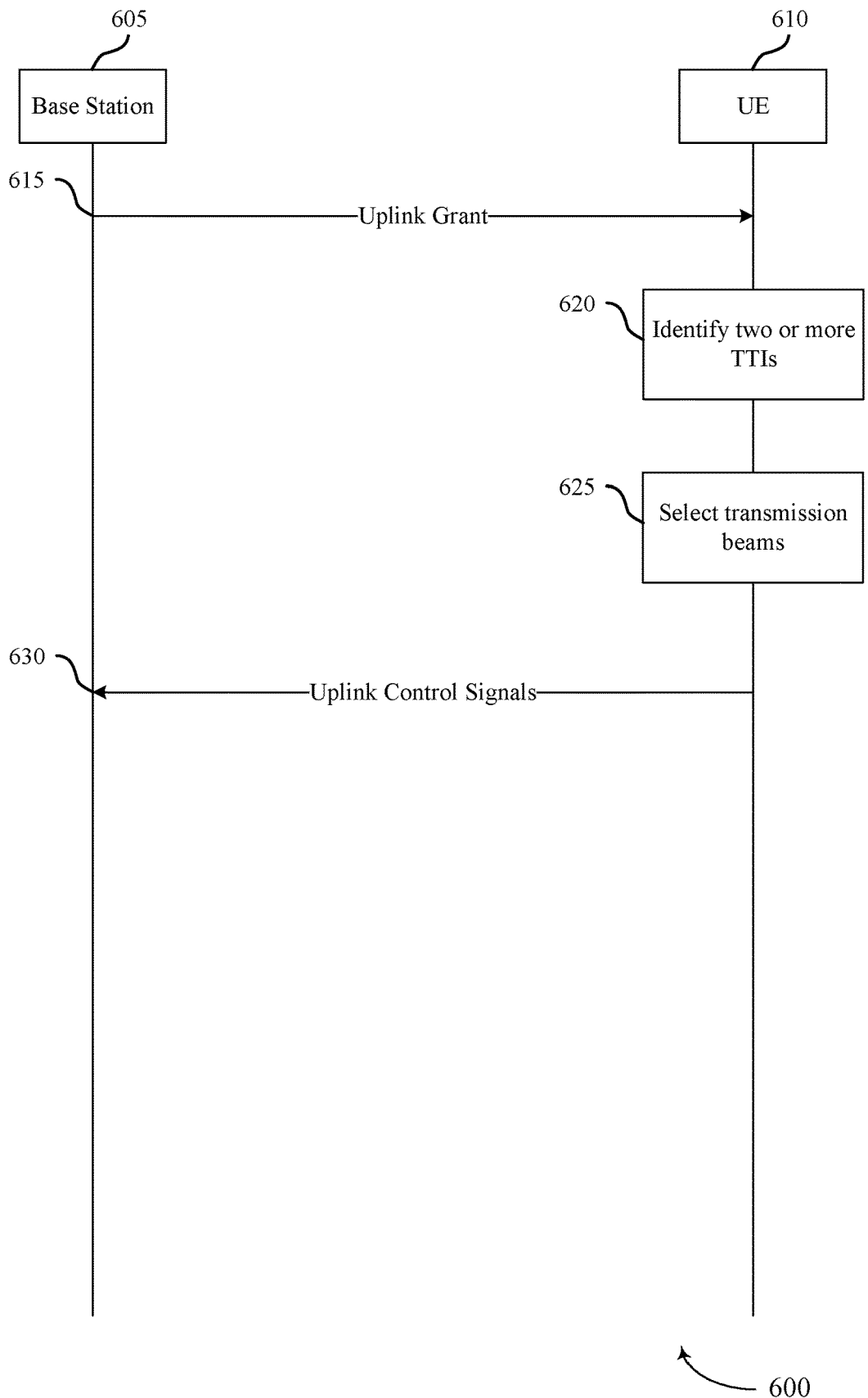
FIG. 6 illustrates an example of a communications flow in a wireless communications system that supports uplink multi-beam operation in accordance with aspects of the present disclosure.

FIG. 6 illustrates an example of a communications flow 600 in a wireless communications system that supports uplink multi-beam operation in accordance with various aspects of the present disclosure. In some examples, the wireless communications system may implement aspects of wireless communications system 100.

The communications flow 600 shows communications between a base station 605 and a UE 610. The base station 605 and the UE 610 may be examples of aspects of base station 105 and UE 115, respectively, as described with reference to FIG. 1.

The base station 605 may transmit an uplink grant 615 to the UE 610. The uplink grant 615 may be a PUCCH uplink grant and may be transmitted in downlink control information (DCI). The uplink grant 615 may include an indication of two or more sets of uplink resources that may be used for transmitting repetitions of an uplink control signal. The uplink grant 615 may also include an indication of a transmission beam to be used for each set of uplink resources. For example, the uplink grant 615 may include two or more acknowledgement resource indicators (ARIs), which may identify acknowledgement resources on two TTIs. Each ARI may correspond to a k1 value (e.g., PDSCH to HARQ feedback timing indicator in, e.g., DCI format 1_0 or 1_1). In some other examples, the DCI may indicate a single k1 value, and the remaining k1 values may be determined based on a TTI-repetition scheme. In some examples, the uplink grant 615 may include transmission parameters (e.g., power control parameters) for one or more of the sets of uplink resources. In some examples, parameters of different resources may follow the parameters in a resource configuration, or may be deduced from information in the uplink grant and/or from the parameters of a first resource (e.g., a TTI). For example, all TTIs or slots may use a same PUCCH format, even if later resource configurations indicate a different PUCCH format. In cases in which respective resource configuration is followed, there may be some constraints, e.g., all resources may be of a same PUCCH format, otherwise the uplink grant may be rejected. In some examples, periodic and/or semi-persistent resource or transmission, the resource or transmission configuration may identify more than one PUCCH resource, e.g., instead of identifying a single PUCCH resource that has been configured for multi-beam operation. Such identification of more than one PUCCH resource may apply to scheduling request, periodic CSI reporting, or semi-persistent CSI reporting. In such cases, more flexibility (e.g., in resource overhead) since the configuration is semi-static. For example, non-consecutive slots or TTIs may be used for multi-slot transmission. In another example, PUCCH multi-slot configuration may apply to all PUCCH resources of that PUCH format, allowing selective enabling of multi-slot transmission only for certain uses (e.g., for scheduling request).

The UE 610 may identify two or more TTIs at 620. The UE 610 may identify the two or more TTIs based at least in part on the uplink grant 615. For example, the two or more TTIs may correspond to the two or more sets of resources.

The UE 610 may select transmission beams for each of the two or more TTIs at 625. The UE 610 may identify the transmission beams for the two or more TTIs based at least in part on the uplink grant 615. For example, the transmission beam for each TTI may be identified in the uplink grant 615. In some other examples, the transmission beam for one of the TTIs may be identified in the uplink grant 615, and the UE 610 may determine the transmission beams for the other TTIs based at least in part on the transmission beam identified in the uplink grant 615.

The UE 610 transmits repetitions of the uplink control signal 630. The UE 610 may transmit each repetition of the uplink control signal on one of the TTIs identified at 620. The UE 610 may use the transmission beams selected at 625 to transmit the repetitions of the uplink control signal in the corresponding TTI.

Figure 7:
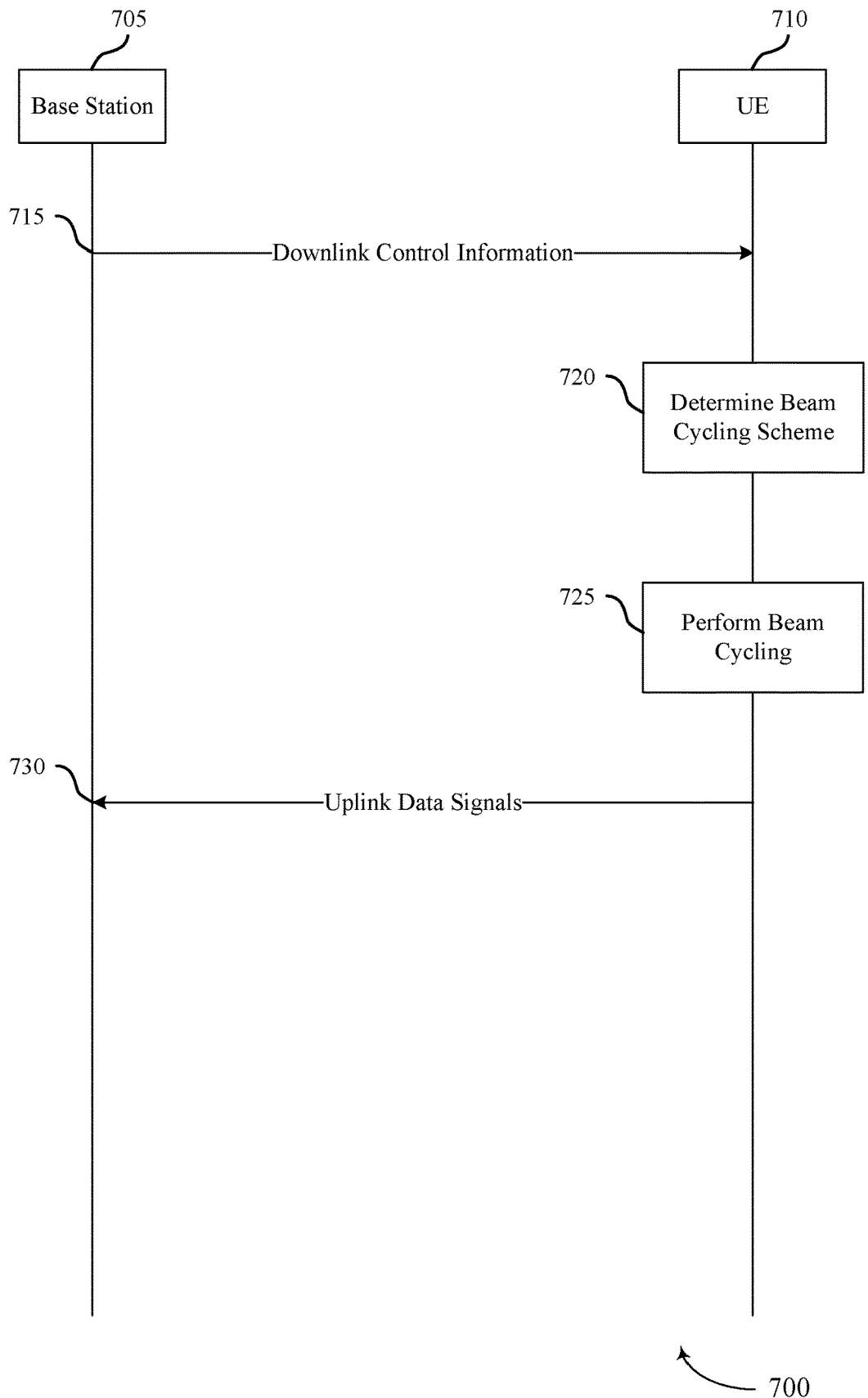
FIG. 7 illustrates an example of a communications flow in a wireless communications system that supports uplink multi-beam operation in accordance with aspects of the present disclosure.

FIG. 7 illustrates an example of a communications flow 700 in a wireless communications system that supports uplink multi-beam operation in accordance with various aspects of the present disclosure. In some examples, the wireless communications system may implement aspects of wireless communications system 100.

The communications flow 700 shows communications between a base station 705 and a UE 710. The base station 705 and the UE 710 may be examples of aspects of base station 105 and UE 115, respectively, as described with reference to FIG. 1.

The base station 705 may transmit DCI 715 to the UE 710. The DCI 715 may indicate that an uplink data signal is to be transmitted using two or more transmission beams during different TTIs. The DCI 715 may also include one or more sounding reference signal (SRS) resource indicators.

In some examples, the DCI 715 may include two or more SRS resource indicators. In some examples, the DCI 715 may include a single SRS resource indicator. In some examples, the DCI 715 may include an indication of a beam cycling pattern (e.g., an index corresponding to a beam cycling pattern).

The UE 710 may determine a beam cycling scheme at 720. In some examples, the UE 710 may identify two or more SRS resource indicators based at least in part on the DCI 715. The UE 710 may determine the beam cycling period based at least in part on the two or more SRS resource indicators, or the beam cycling period may be pre-configured.

In some examples, the UE 710 may identify the single SRS resource indicator based at least in part on the DCI 715. The UE 710 may identify additional SRS resource indicators based at least in part on the single SRS indicator. For example, the UE 710 may identify a set of the next N SRS resource indicators, or a set of the previous N resource indicators, where "next" and "previous" refer to next and previous SRS indices or next and previous transmitted SRSs and N is an integer. The UE 710 may determine the beam cycling period based at least in part on the single SRS resource indicator, or the beam cycling period may be pre-configured.

In some examples, the UE 710 may identify an index based at least in part on the DCI 715. The UE 710 may determine a beam cycling pattern based at least in part on a stored set of indices. For example, the UE 710 may have been previously configured with a set of indices and the corresponding beam cycling patterns by the base station 705 (e.g., via RRC signaling or MAC-CE). The UE 710 may identify the beam cycling pattern corresponding to the identified index based at least in part on the previously-configured indices.

The UE 710 may perform beam cycling at 725. The UE 710 may perform the beam cycling based at least in part on the beam cycling scheme determined at 720.

The UE 710 may transmit repetitions of the uplink data signal 730. The UE 710 may follow the beam of the SRS indicated by the SRS resource indicators. The UE 710 may transmit the repetitions of the uplink data signal 730 based at least in part on the beam cycling procedure performed at 725.

Figure 8:
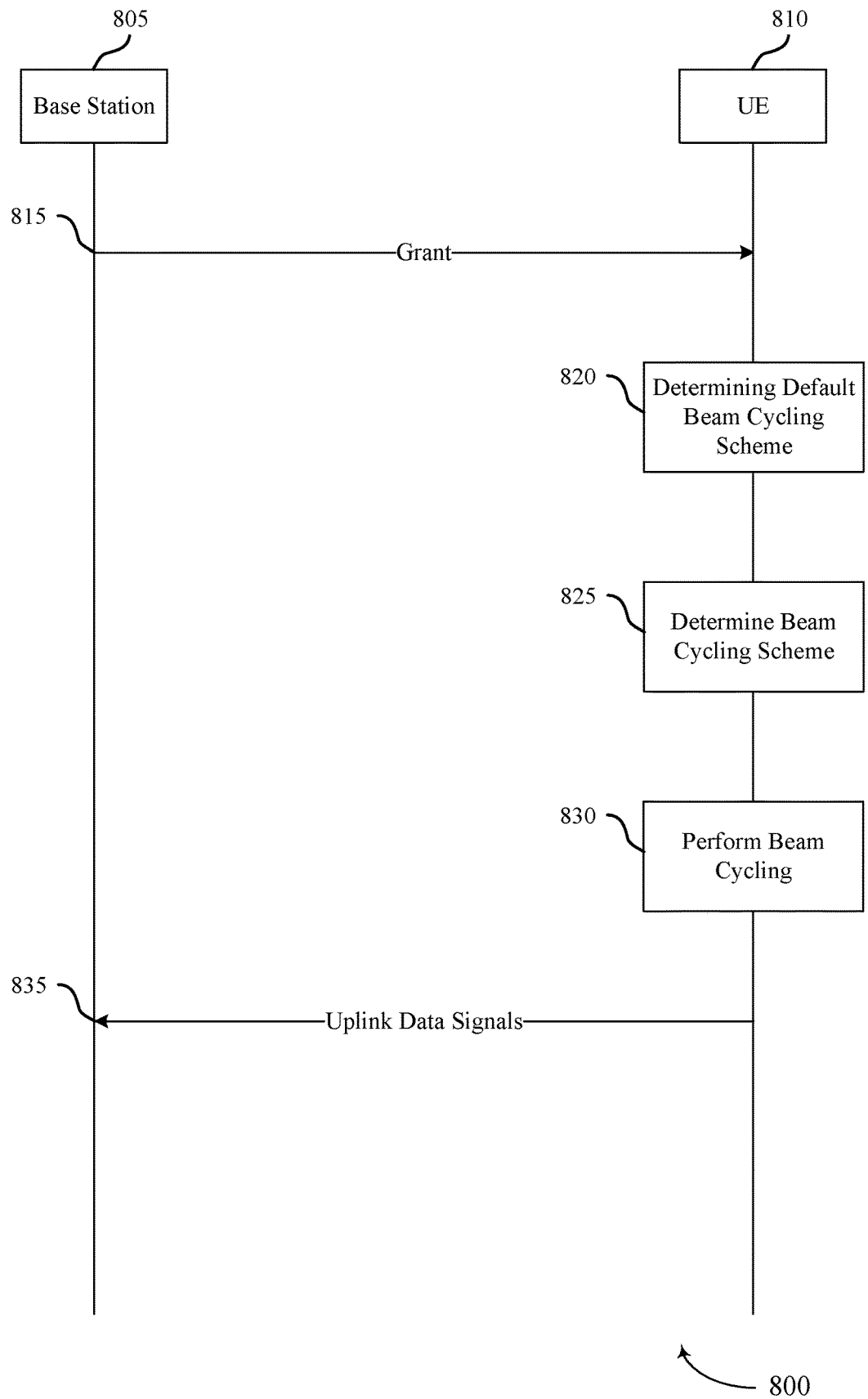
FIG. 8 illustrates an example of a communications flow in a wireless communications system that supports uplink multi-beam operation in accordance with aspects of the present disclosure.

FIG. 8 illustrates an example of a communications flow 800 in a wireless communications system that supports uplink multi-beam operation in accordance with various aspects of the present disclosure. In some examples, the wireless communications system may implement aspects of wireless communications system 100.

The communications flow 800 shows communications between a base station 805 and a UE 810. The base station 805 and the UE 810 may be examples of aspects of base station 105 and UE 115, respectively, as described with reference to FIG. 1.

The base station 805 may transmit a grant 815 to the UE 810. The grant 815 may indicate resources to be used for uplink data transmissions. In some examples, the grant 815 may be a PUSCH grant.

At 820, the UE 810 may determine a default beam cycling scheme based on receipt of the grant 815. In some examples, the default beam cycling scheme may be determined based at least in part on a beam cycling scheme for a PUCCH beam. In some examples, the default beam cycling scheme may be determined based at least in part on a default beam cycling scheme for a PUSCH beam. In some examples, the default beam cycling scheme may be determined based at least in part on a beam cycling scheme for a downlink beam.

In some examples, the UE 810 may be configured with multiple fixed PUCCH resources to indicate multiple default PUSCH beams. The UE 810 may cycle through the multiple PUSCH beams in repeated PUSCH TTIs. The default PUSCH beams may be updated, e.g., by MAC-CE updates.

The UE 810 may determine a beam cycling scheme at 825. The beam cycling scheme may be determined based at least in part on the default beam cycling scheme determined at 820. In some examples, the beam cycling scheme may be the default beam cycling scheme. In some other examples, the beam cycling scheme may be a modified default beam cycling scheme. For example, the default beam cycling scheme may use per-N-TTI cycling, where N is an integer. The number N may differ between the beam corresponding to the default beam cycling scheme and the PUSCH beam. Accordingly, the number N may be modified to correspond to the PUSCH beam.

The UE 810 may perform beam cycling at 830. The beam cycling may be performed based at least in part on the beam cycling scheme determined at 825. The UE 810 may transmit repetitions of the uplink data signal 835 to the base station 805. The repetitions of the uplink data signal 835 may be transmitted based at least in part on the beam cycling procedure of 830.

Figure 9:
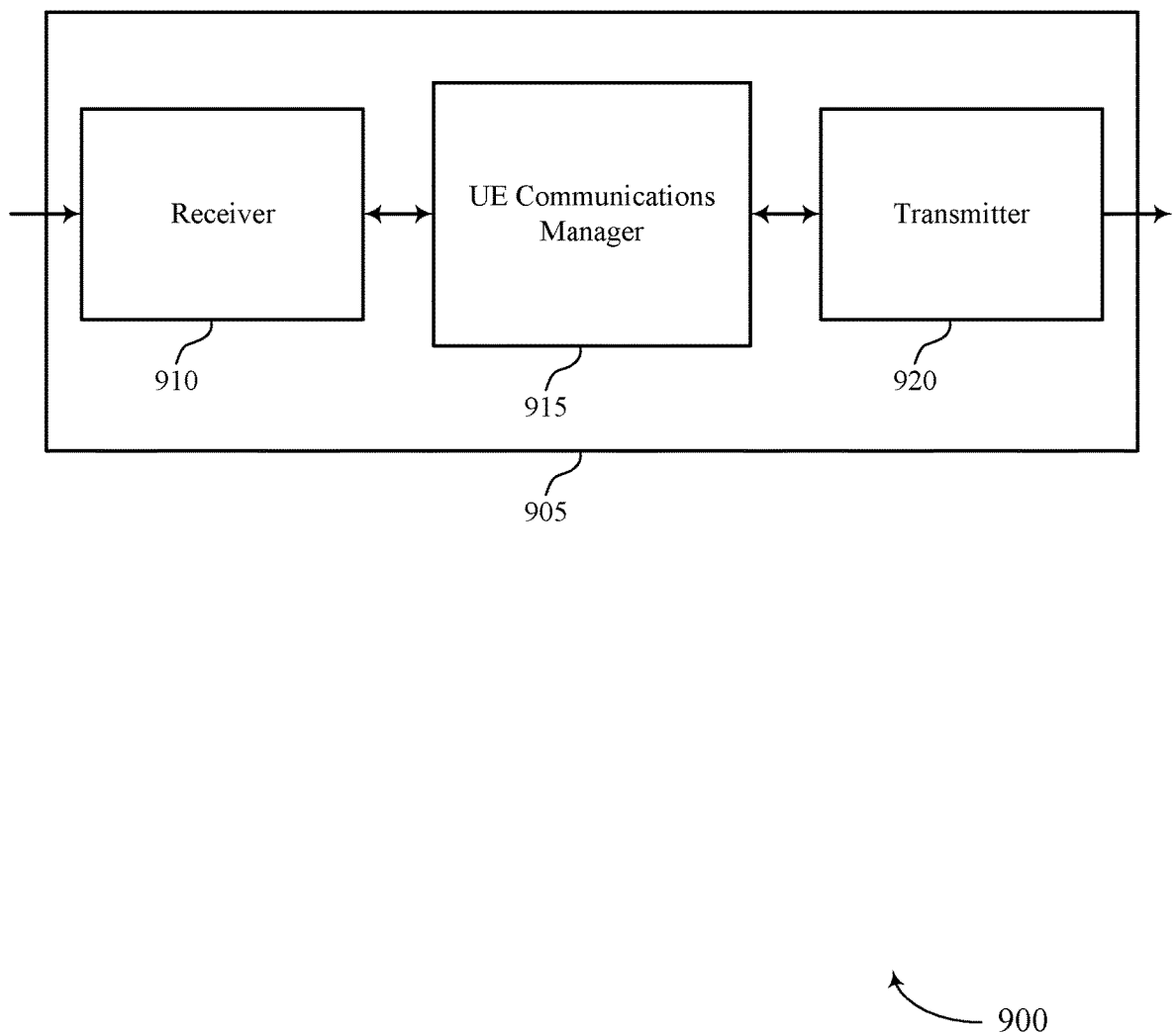
FIGS. 9 through 11 show block diagrams of a device that supports uplink multi-beam operation in accordance with aspects of the present disclosure.

FIG. 9 shows a block diagram 900 of a wireless device 905 that supports uplink multi-beam operation in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink multi-beam operation, etc.). Information may be passed on to other components of the device 905. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive a downlink control signal indicating that an uplink control signal is to be transmitted using two or more transmission beams during different transmission time intervals (TTIs), identify the two or more transmission beams based on the downlink control signal, and transmit a plurality of repetitions of the uplink control signal, where each repetition is transmitted on a different TTI using a different one of the two or more transmission beams based on the downlink control signal. The UE communications manager 915 may also receive downlink control information (DCI) indicating that an uplink data signal is to be transmitted using two or more transmission beams during different transmission time intervals (TTIs) and at least one sounding reference signal (SRS) resource indicator, determine, based on the at least one SRS resource indicator, a transmission beam cycling scheme for the uplink data signal, and transmit a plurality of repetitions of the uplink data signal, where each repetition is transmitted on a different TTI using a different one of the two or more transmission beams based on the beam cycling scheme. The UE communications manager 915 may also receive a grant indicating resources for an uplink data transmission, determine a default beam cycling scheme for uplink control signals, determine, based on the default beam cycling scheme for a control channel, a beam cycling scheme for the uplink data transmission, and transmit a plurality of repetitions of the uplink data signal, where each repetition is transmitted on a different TTI using a different one of two or more transmission beams based on the determined beam cycling scheme for the uplink data transmission.

Transmitter 920 may transmit signals generated by other components of the device 905. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
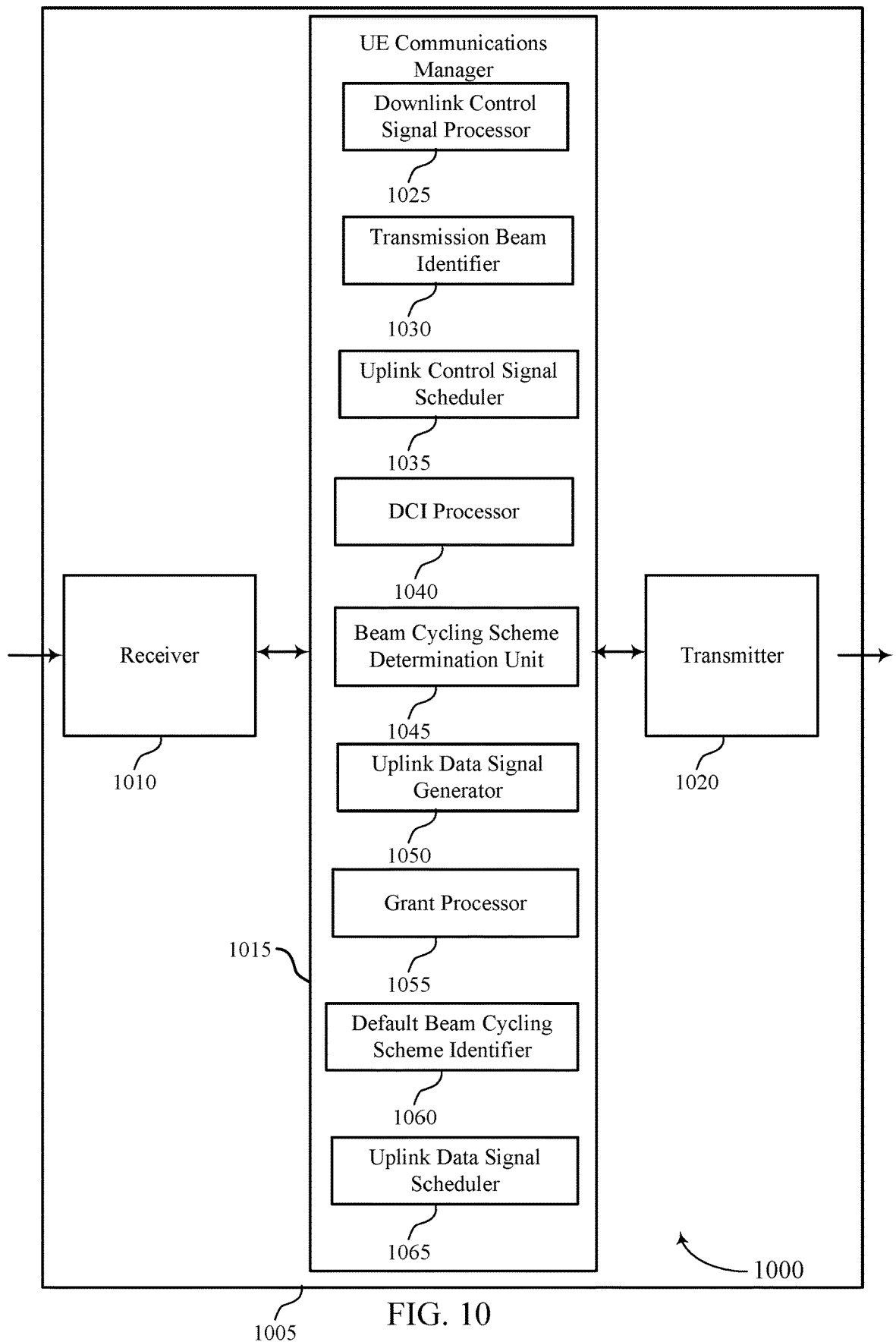

FIG. 10 shows a block diagram 1000 of a wireless device 1005 that supports uplink multi-beam operation in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink multi-beam operation, etc.). Information may be passed on to other components of the device 1005. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include downlink control signal processor 1025, transmission beam identifier 1030, uplink control signal scheduler 1035, DCI processor 1040, beam cycling scheme determination unit 1045, uplink data signal generator 1050, grant processor 1055, default beam cycling scheme identifier 1060, and uplink data signal scheduler 1065.

Downlink control signal processor 1025 may receive a downlink control signal indicating that an uplink control signal is to be transmitted using two or more transmission beams during different transmission time intervals (TTIs) and receive a beam cycling information element in the radio resource control (RRC) signal, the beam cycling information element indicating a number of the two or more transmission beams. In some cases, the beam cycling information element is associated with one or more of: an uplink resource of the uplink control signal or a type of uplink resource of the uplink control signal.

Transmission beam identifier 1030 may identify the two or more transmission beams based on the downlink control signal and identify different sets of uplink resources for different repetitions of the uplink control signal based on the uplink grant, where each set of uplink resources is associated with a different one of the two or more transmission beams. In some cases, the uplink grant includes a persistent or semi-persistent grant. In some cases, an order of transmitting the plurality of repetitions of the uplink control signal is based on an order of the received spatial relation information elements.

Uplink control signal scheduler 1035 may transmit a plurality of repetitions of the uplink control signal, where each repetition is transmitted on a different TTI using a different one of the two or more transmission beams based on the downlink control signal. In some cases, transmitting the plurality of repetitions of the uplink control signal using the two or more transmission beams includes: cycling through the two or more transmission beams based on a transmitted TTI index, an absolute TTI index associated with the uplink control signal, or a group of TTIs associated with the uplink control signal.

DCI processor 1040 may receive DCI indicating that an uplink data signal is to be transmitted using two or more transmission beams during different transmission time intervals (TTIs) and at least one SRS resource indicator. In some cases, the DCI includes an index corresponding to the beam cycling scheme.

Beam cycling scheme determination unit 1045 may determine, based on the at least one SRS resource indicator, a transmission beam cycling scheme for the uplink data signal, determine a cycling period based on the two or more SRS resource indicators, determine the beam cycling scheme based on the index, and determine, based on the default beam cycling scheme for a control channel, a beam cycling scheme for the uplink data transmission. In some cases, the default beam cycling scheme for the control channel is based on the default beam for the physical uplink shared channel. In some cases, the control channel includes one or more of: an uplink control channel or a downlink control channel.

Uplink data signal generator 1050 may transmit a plurality of repetitions of the uplink data signal, where each repetition is transmitted on a different TTI using a different one of the two or more transmission beams based on the beam cycling scheme. In some cases, the plurality of repetitions of the uplink data signal are transmitted in transmission opportunities following resources indicated by the two or more SRS resource indicators.

Grant processor 1055 may receive a grant indicating resources for an uplink data transmission.

Default beam cycling scheme identifier 1060 may determine a default beam cycling scheme for uplink control signals and identify the configuration includes identifying a default beam for a physical uplink shared channel associated with the uplink data transmission.

Uplink data signal scheduler 1065 may transmit a plurality of repetitions of the uplink data signal, where each repetition is transmitted on a different TTI using a different one of two or more transmission beams based on the determined beam cycling scheme for the uplink data transmission.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
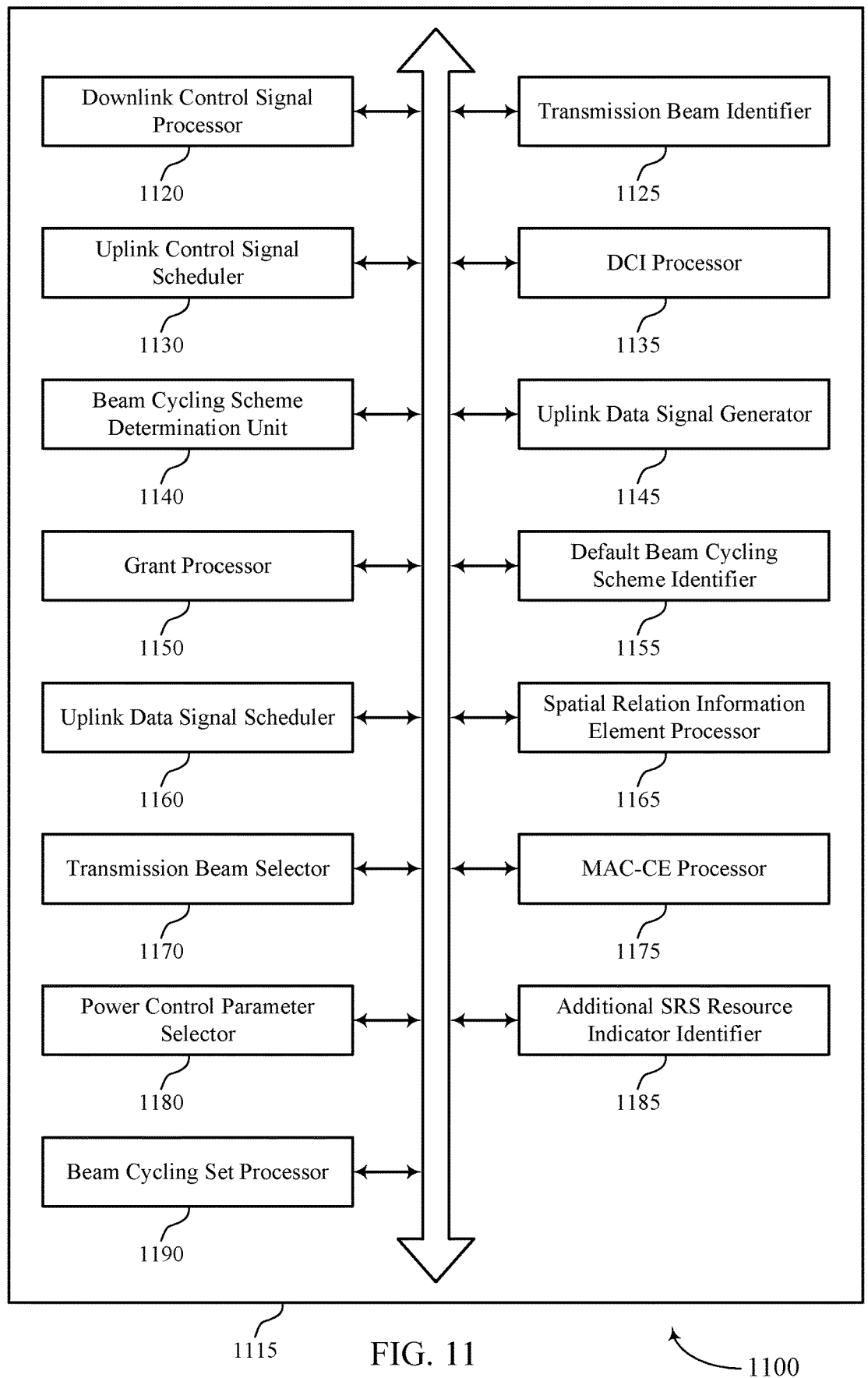

FIG. 11 shows a block diagram 1100 of a UE communications manager 1115 that supports uplink multi-beam operation in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include downlink control signal processor 1120, transmission beam identifier 1125, uplink control signal scheduler 1130, DCI processor 1135, beam cycling scheme determination unit 1140, uplink data signal generator 1145, grant processor 1150, default beam cycling scheme identifier 1155, uplink data signal scheduler 1160, spatial relation information element processor 1165, transmission beam selector 1170, media access control (MAC) CE processor 1175, power control parameter selector 1180, additional SRS resource indicator identifier 1185, and beam cycling set processor 1190. Each of these modules may communicate, directly or indirectly, with one another (e.g., via one or more buses).

Downlink control signal processor 1120 may receive a downlink control signal indicating that an uplink control signal is to be transmitted using two or more transmission beams during different transmission time intervals (TTIs) and receive a beam cycling information element in the RRC signal, the beam cycling information element indicating a number of the two or more transmission beams. In some cases, the beam cycling information element is associated with one or more of: an uplink resource of the uplink control signal or a type of uplink resource of the uplink control signal.

Transmission beam identifier 1125 may identify the two or more transmission beams based on the downlink control signal and identify different sets of uplink resources for different repetitions of the uplink control signal based on the uplink grant, where each set of uplink resources is associated with a different one of the two or more transmission beams. In some cases, the uplink grant includes a persistent or semi-persistent grant. In some cases, an order of transmitting the plurality of repetitions of the uplink control signal is based on an order of the received spatial relation information elements.

Uplink control signal scheduler 1130 may transmit a plurality of repetitions of the uplink control signal, where each repetition is transmitted on a different TTI using a different one of the two or more transmission beams based on the downlink control signal. In some cases, transmitting the plurality of repetitions of the uplink control signal using the two or more transmission beams includes: cycling through the two or more transmission beams based on a transmitted TTI index, an absolute TTI index associated with the uplink control signal, or a group of TTIs associated with the uplink control signal (i.e., per N-TTI basis).

DCI processor 1135 may receive DCI indicating that an uplink data signal is to be transmitted using two or more transmission beams during different transmission time intervals (TTIs) and at least one SRS resource indicator. In some cases, the DCI includes an index corresponding to the beam cycling scheme.

Beam cycling scheme determination unit 1140 may determine, based on the at least one SRS resource indicator, a transmission beam cycling scheme for the uplink data signal, determine a cycling period based on the two or more SRS resource indicators, determine the beam cycling scheme based on the index, and determine, based on the default beam cycling scheme for a control channel, a beam cycling scheme for the uplink data transmission. In some cases, the default beam cycling scheme for the control channel is based on the default beam for the physical uplink shared channel. In some cases, the control channel includes one or more of: an uplink control channel or a downlink control channel.

Uplink data signal generator 1145 may transmit a plurality of repetitions of the uplink data signal, where each repetition is transmitted on a different TTI using a different one of the two or more transmission beams based on the beam cycling scheme. In some cases, the plurality of repetitions of the uplink data signal are transmitted in transmission opportunities following resources indicated by the two or more SRS resource indicators.

Grant processor 1150 may receive a grant indicating resources for an uplink data transmission.

Default beam cycling scheme identifier 1155 may determine a default beam cycling scheme for uplink control signals and identify the configuration includes identifying a default beam for a physical uplink shared channel associated with the uplink data transmission.

Uplink data signal scheduler 1160 may transmit a plurality of repetitions of the uplink data signal, where each repetition is transmitted on a different TTI using a different one of two or more transmission beams based on the determined beam cycling scheme for the uplink data transmission.

Spatial relation information element processor 1165 may receive a set of spatial relation information elements, each spatial relation information element associated with a different transmission beam, where identifying the two or more transmission beams is further based on the spatial relation information elements.

Transmission beam selector 1170 may select transmission beams to be used for transmitting repetitions of the uplink control signals. In some cases, identifying the two or more transmission beams includes: selecting the two or more transmission beams based on an order of the spatial relation information elements.

MAC-CE processor 1175 may process a received medium access control (MAC) control element (CE). In some cases, identifying the two or more transmission beams includes: receiving a medium access control (MAC) control element (CE) indicating a set of spatial relation information elements corresponding to the two or more transmission beams in the set of received spatial relation information elements.

Power control parameter selector 1180 may select a power control parameter for transmitting each of the plurality of repetitions of the uplink control signal. In some cases, a first power control parameter for transmission in a first TTI is selected based on a previous power control parameter for transmission in a previous TTI. In some cases, a first power control parameter for transmission in a first TTI is selected based on the first TTI.

Additional SRS resource indicator identifier 1185 may identify a set of additional SRS resource indicators based on the single SRS resource indicator.

Beam cycling set processor 1190 may receive a set of beam cycling schemes, each beam cycling scheme having a corresponding index.

Figure 12:
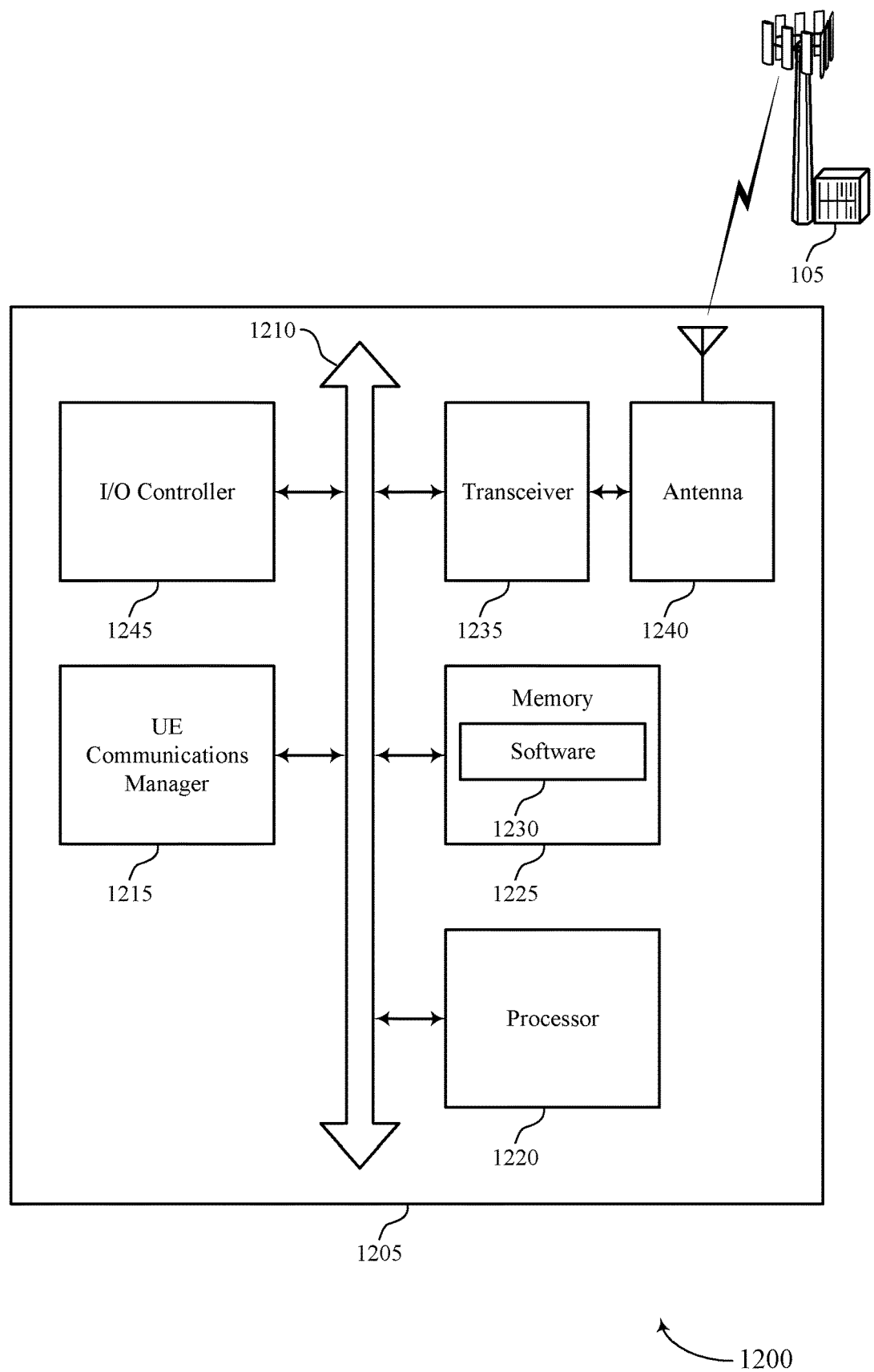
FIG. 12 illustrates a block diagram of a system including a UE that supports uplink multi-beam operation in accordance with aspects of the present disclosure.

FIG. 12 shows a diagram of a system 1200 including a device 1205 that supports uplink multi-beam operation in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink multi-beam operation).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support uplink multi-beam operation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device 1205 may include a single antenna 1240. However, in some cases the device 1205 may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
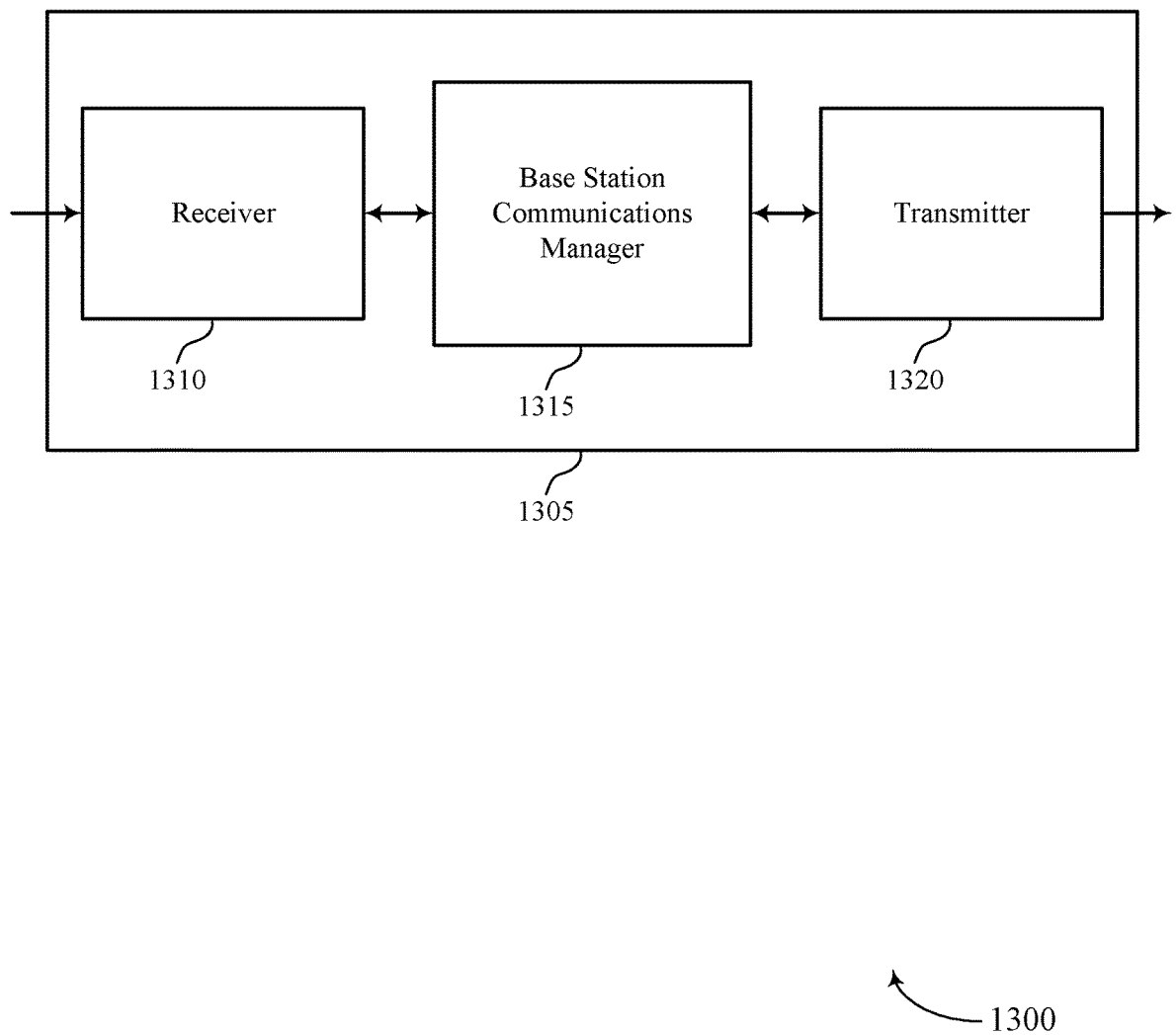
FIGS. 13 through 15 show block diagrams of a device that supports uplink multi-beam operation in accordance with aspects of the present disclosure.

FIG. 13 shows a block diagram 1300 of a wireless device 1305 that supports uplink multi-beam operation in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to uplink multi-beam operation, etc.). Information may be passed on to other components of the device 1305. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may identify two or more transmission beams for receiving an uplink control signal from a UE 115, transmit to the UE 115 a downlink control signal indicating that the uplink control signal is to be transmitted using the two or more transmission beams during different transmission time intervals (TTIs), and receive a plurality of repetitions of the uplink control signal from the UE 115, where each repetition is received on a different TTI using a different one of the two or more transmission beams based on the downlink control signal. The base station communications manager 1315 may also transmit DCI indicating that an uplink data signal is to be transmitted using two or more transmission beams during different transmission time intervals (TTIs) and the indication of the at least one SRS resource indicator, determine, based on the at least one SRS resource indicator, a beam cycling scheme for the uplink data signal, and receive a plurality of repetitions of the uplink data signal, where each repetition is received on a different TTI using a different one of the two or more transmission beams based on the beam cycling scheme.

Transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
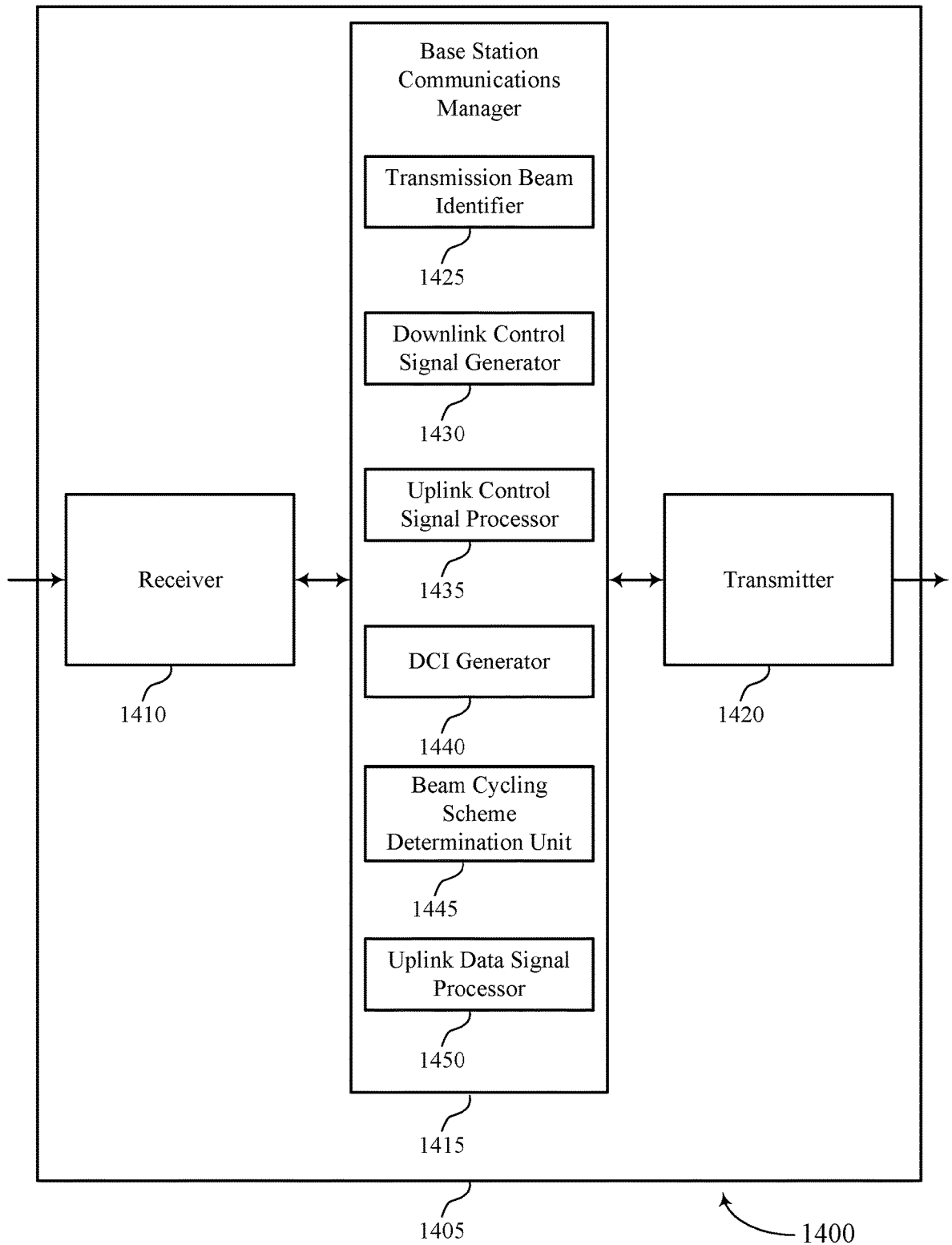

FIG. 14 shows a block diagram 1400 of a wireless device 1405 that supports uplink multi-beam operation in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to uplink multi-beam operation, etc.). Information may be passed on to other components of the device 1405. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16.

Base station communications manager 1415 may also include transmission beam identifier 1425, downlink control signal generator 1430, uplink control signal processor 1435, DCI generator 1440, beam cycling scheme determination unit 1445, and uplink data signal processor 1450.

Transmission beam identifier 1425 may identify two or more transmission beams for receiving an uplink control signal from a UE 115.

Downlink control signal generator 1430 may transmit to the UE 115 a downlink control signal indicating that the uplink control signal is to be transmitted using the two or more transmission beams during different transmission time intervals (TTIs) and include a beam cycling information element in the RRC signal, the beam cycling information element indicating a number of the two or more transmission beams. In some cases, the downlink control signal includes a list of the transmission beams to be used for transmitting the uplink control signal. In some cases, the downlink control signal includes an uplink grant for the uplink control signal, the uplink grant identifying different sets of uplink resources for different repetitions of the uplink control signal, where each set of uplink resources is associated with a different one of the two or more transmission beams.

Uplink control signal processor 1435 may receive a plurality of repetitions of the uplink control signal from the UE 115, where each repetition is received on a different TTI using a different one of the two or more transmission beams based on the downlink control signal.

DCI generator 1440 may transmit DCI indicating that an uplink data signal is to be transmitted using two or more transmission beams during different transmission time intervals (TTIs) and the indication of the at least one SRS resource indicator. In some cases, the indication of the at least one SRS resource indicator includes two or more SRS resource indicators. In some cases, the indication of the at least one SRS resource indicator includes a single SRS resource indicator. In some cases, the indication of the at least one SRS resource indicator includes an index corresponding to the beam cycling scheme.

Beam cycling scheme determination unit 1445 may determine, based on the at least one SRS resource indicator, a beam cycling scheme for the uplink data signal.

Uplink data signal processor 1450 may receive a plurality of repetitions of the uplink data signal, where each repetition is received on a different TTI using a different one of the two or more transmission beams based on the beam cycling scheme.

Transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
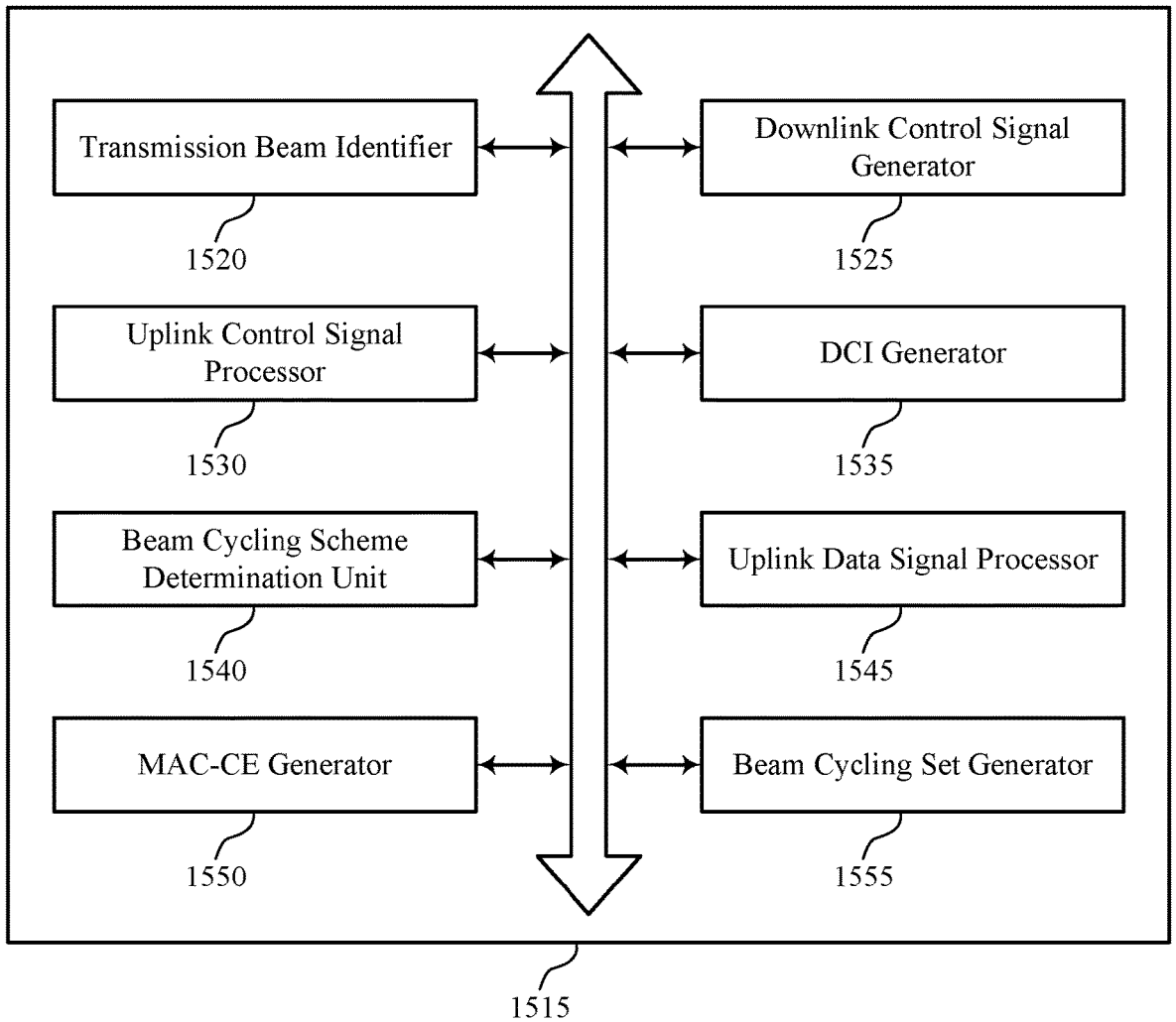

FIG. 15 shows a block diagram 1500 of a base station communications manager 1515 that supports uplink multi-beam operation in accordance with aspects of the present disclosure. The base station communications manager 1515 may be an example of aspects of a base station communications manager 1315, 1415, and 1615 described with reference to FIGS. 13, 14, and 16. The base station communications manager 1515 may include transmission beam identifier 1520, downlink control signal generator 1525, uplink control signal processor 1530, DCI generator 1535, beam cycling scheme determination unit 1540, uplink data signal processor 1545, MAC-CE generator 1550, and beam cycling set generator 1555. Each of these modules may communicate, directly or indirectly, with one another (e.g., via one or more buses).

Transmission beam identifier 1520 may identify two or more transmission beams for receiving an uplink control signal from a UE 115.

Downlink control signal generator 1525 may transmit to the UE 115 a downlink control signal indicating that the uplink control signal is to be transmitted using the two or more transmission beams during different transmission time intervals (TTIs) and include a beam cycling information element in the RRC signal, the beam cycling information element indicating a number of the two or more transmission beams. In some cases, the downlink control signal includes a list of the transmission beams to be used for transmitting the uplink control signal. In some cases, the downlink control signal includes an uplink grant for the uplink control signal, the uplink grant identifying different sets of uplink resources for different repetitions of the uplink control signal, where each set of uplink resources is associated with a different one of the two or more transmission beams.

Uplink control signal processor 1530 may receive a plurality of repetitions of the uplink control signal from the UE 115, where each repetition is received on a different TTI using a different one of the two or more transmission beams based on the downlink control signal.

DCI generator 1535 may transmit DCI indicating that an uplink data signal is to be transmitted using two or more transmission beams during different transmission time intervals (TTIs) and the indication of the at least one SRS resource indicator. In some cases, the indication of the at least one SRS resource indicator includes two or more SRS resource indicators. In some cases, the indication of the at least one SRS resource indicator includes a single SRS resource indicator. In some cases, the indication of the at least one SRS resource indicator includes an index corresponding to the beam cycling scheme.

Beam cycling scheme determination unit 1540 may determine, based on the at least one SRS resource indicator, a beam cycling scheme for the uplink data signal.

Uplink data signal processor 1545 may receive a plurality of repetitions of the uplink data signal, where each repetition is received on a different TTI using a different one of the two or more transmission beams based on the beam cycling scheme.

MAC-CE generator 1550 may transmit a medium access control (MAC) control element (CE), where the MAC-CE includes a list of two or more spatial relation information elements. In some cases, the two or more spatial relation information elements are listed in an order to be used for beam cycling.

Beam cycling set generator 1555 may transmit a set of beam cycling schemes, each beam cycling scheme having a corresponding index.

Figure 16:
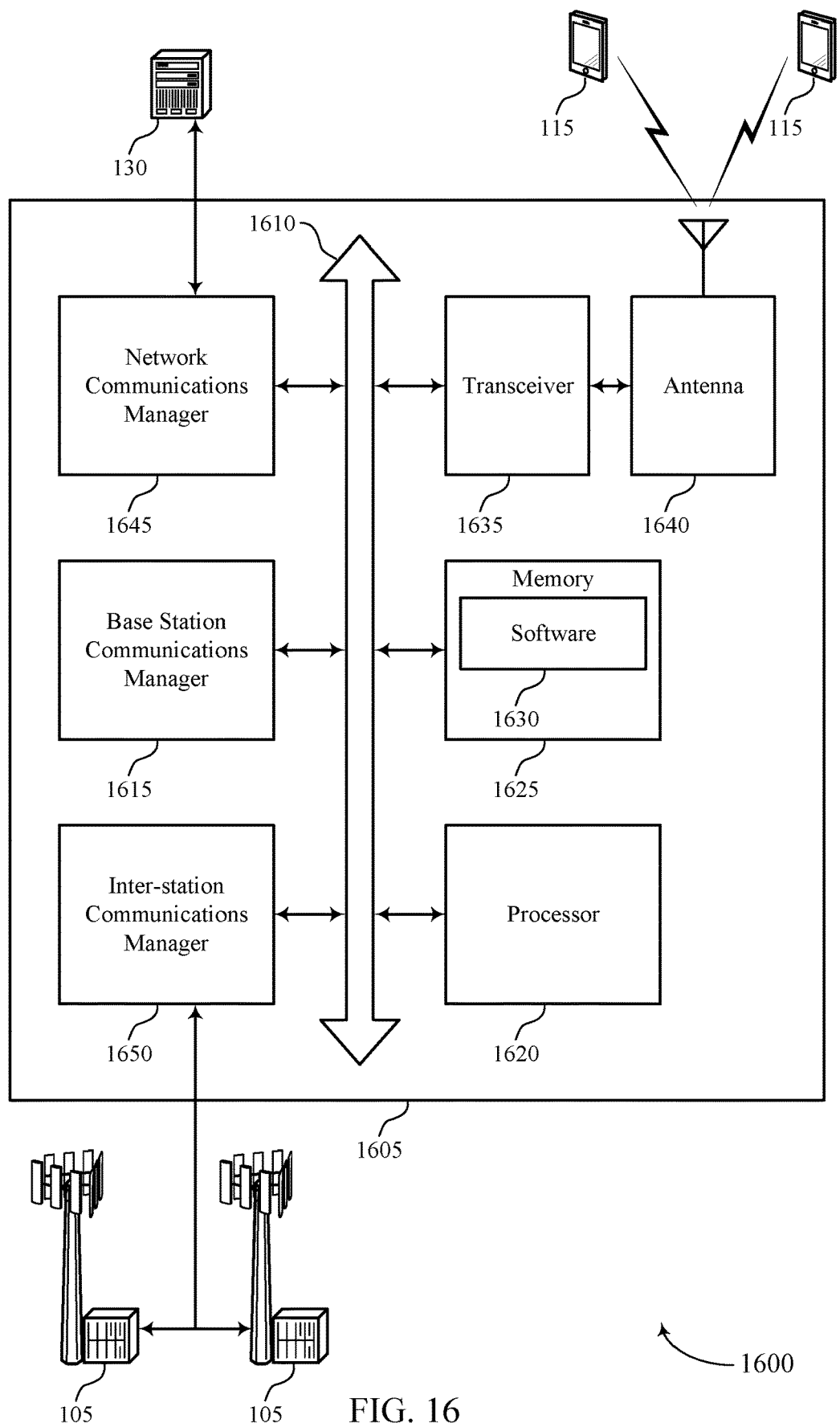
FIG. 16 illustrates a block diagram of a system including a base station that supports uplink multi-beam operation in accordance with aspects of the present disclosure.

FIG. 16 shows a diagram of a system 1600 including a device 1605 that supports uplink multi-beam operation in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting uplink multi-beam operation).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support uplink multi-beam operation. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device 1605 may include a single antenna 1640. However, in some cases the device 1605 may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
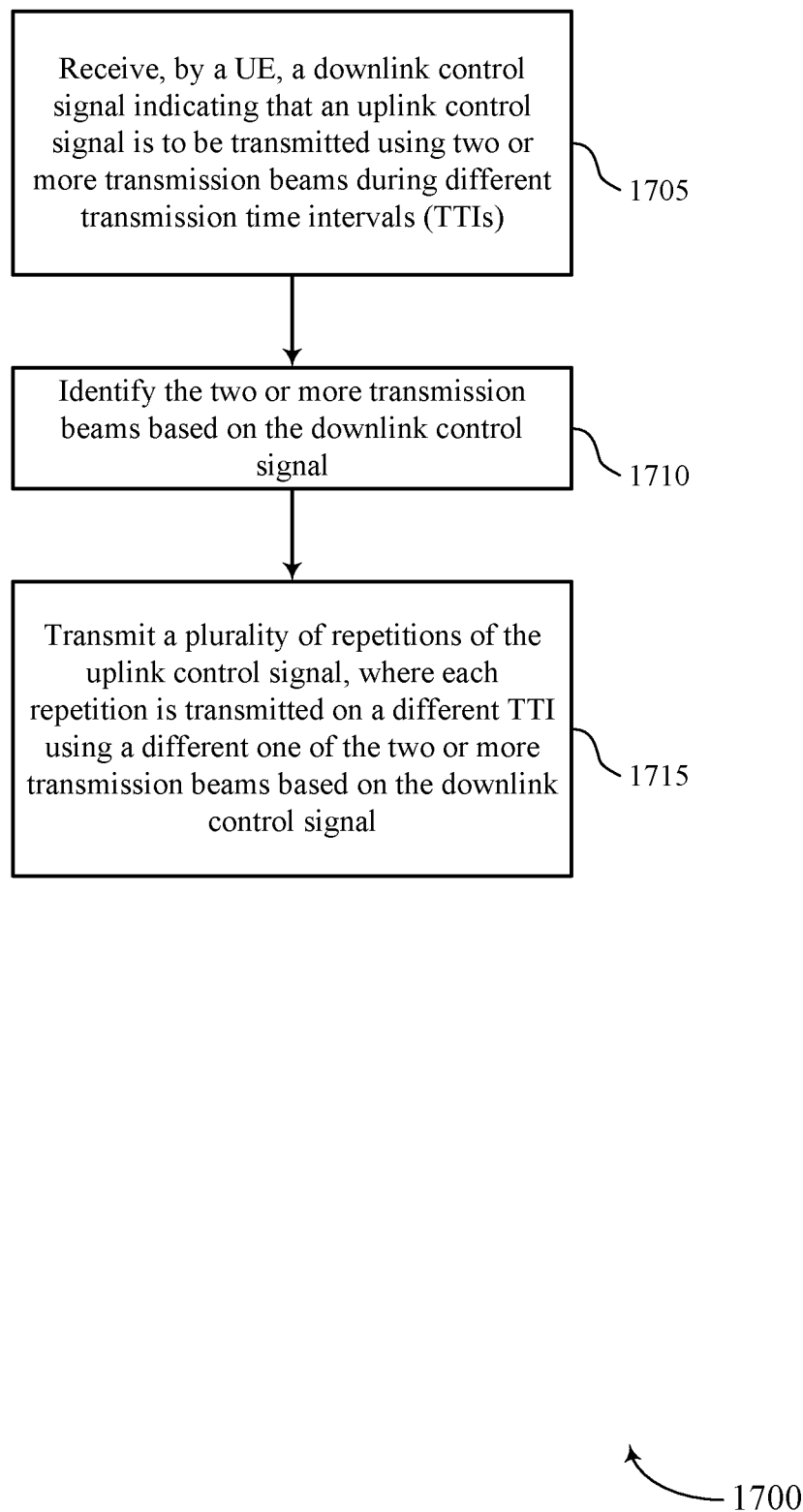
FIGS. 17 through 26 illustrate methods for uplink multi-beam operation in accordance with aspects of the present disclosure.

FIG. 17 shows a flowchart illustrating a method 1700 for uplink multi-beam operation in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive a downlink control signal indicating that an uplink control signal is to be transmitted using two or more transmission beams during different transmission time intervals (TTIs). The operations of 1705 may be performed according to the methods described herein. In certain examples, aspects of the operations of 1705 may be performed by a downlink control signal processor as described with reference to FIGS. 9 through 12.

At 1710, the UE 115 may identify the two or more transmission beams based at least in part on the downlink control signal. The operations of 1710 may be performed according to the methods described herein. In certain examples, aspects of the operations of 1710 may be performed by a transmission beam identifier as described with reference to FIGS. 9 through 12.

At 1715, the UE 115 may transmit a plurality of repetitions of the uplink control signal, where each repetition is transmitted on a different TTI using a different one of the two or more transmission beams based at least in part on the downlink control signal. The operations of 1715 may be performed according to the methods described herein. In certain examples, aspects of the operations of 1715 may be performed by a uplink control signal scheduler as described with reference to FIGS. 9 through 12.

Figure 18:
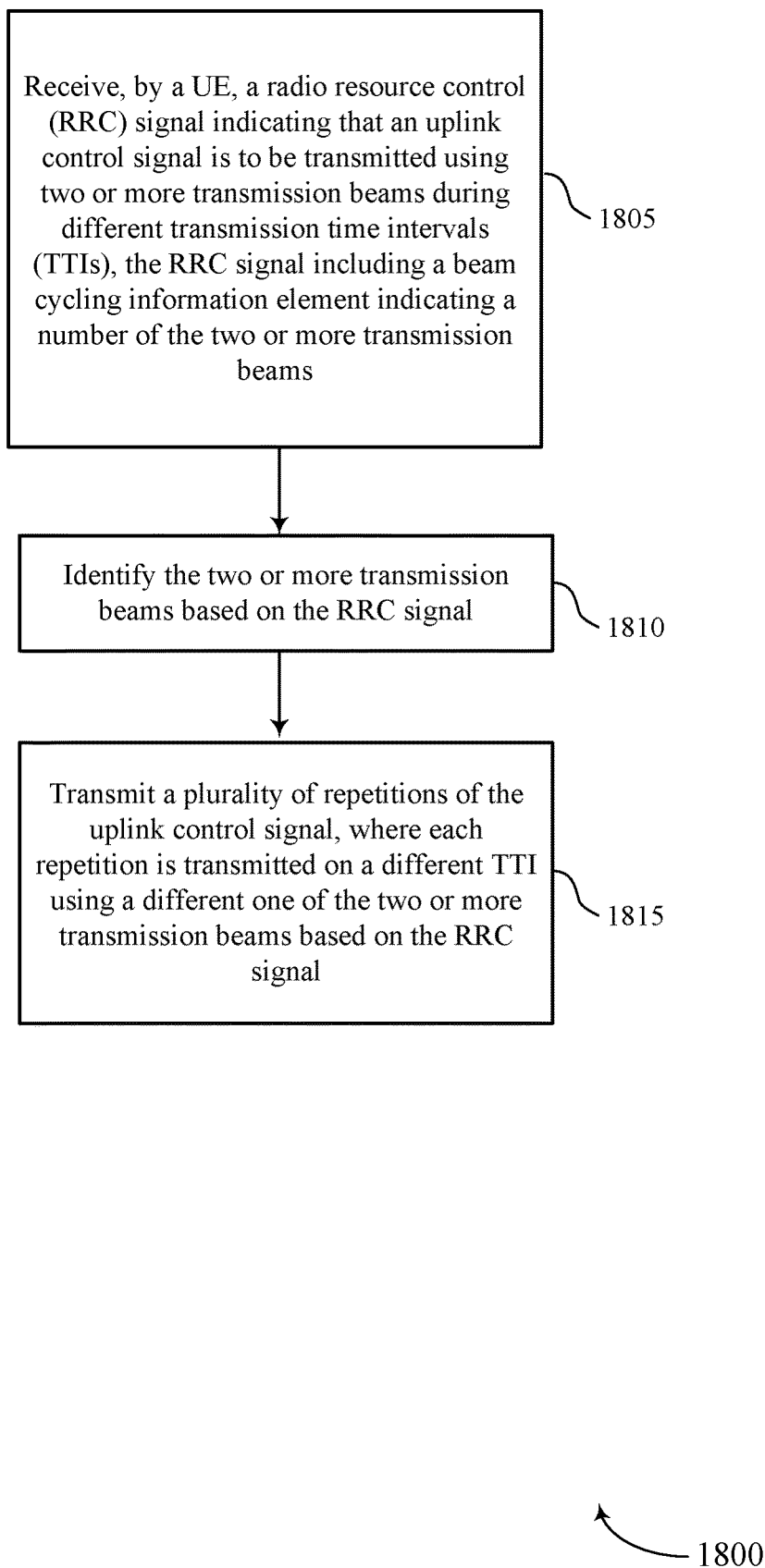

FIG. 18 shows a flowchart illustrating a method 1800 for uplink multi-beam operation in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may receive a radio resource control (RRC) signal indicating that an uplink control signal is to be transmitted using two or more transmission beams during different transmission time intervals (TTIs). The RRC signal may include a beam cycling information element indicating a number of the two or more transmission beams. The operations of 1805 may be performed according to the methods described herein. In certain examples, aspects of the operations of 1805 may be performed by a downlink control signal processor as described with reference to FIGS. 9 through 12.

At 1810, the UE 115 may identify the two or more transmission beams based at least in part on the RRC signal. The two or more transmission beams may be identified based at least in part on the number of the two or more transmission beams indicated in the beam cycling information element. The operations of 1810 may be performed according to the methods described herein. In certain examples, aspects of the operations of 1810 may be performed by a transmission beam identifier as described with reference to FIGS. 9 through 12.

At 1815, the UE 115 may transmit a plurality of repetitions of the uplink control signal, where each repetition is transmitted on a different TTI using a different one of the two or more transmission beams based at least in part on the RRC signal. The operations of 1815 may be performed according to the methods described herein. In certain examples, aspects of the operations of 1815 may be performed by a uplink control signal scheduler as described with reference to FIGS. 9 through 12.

Figure 19:
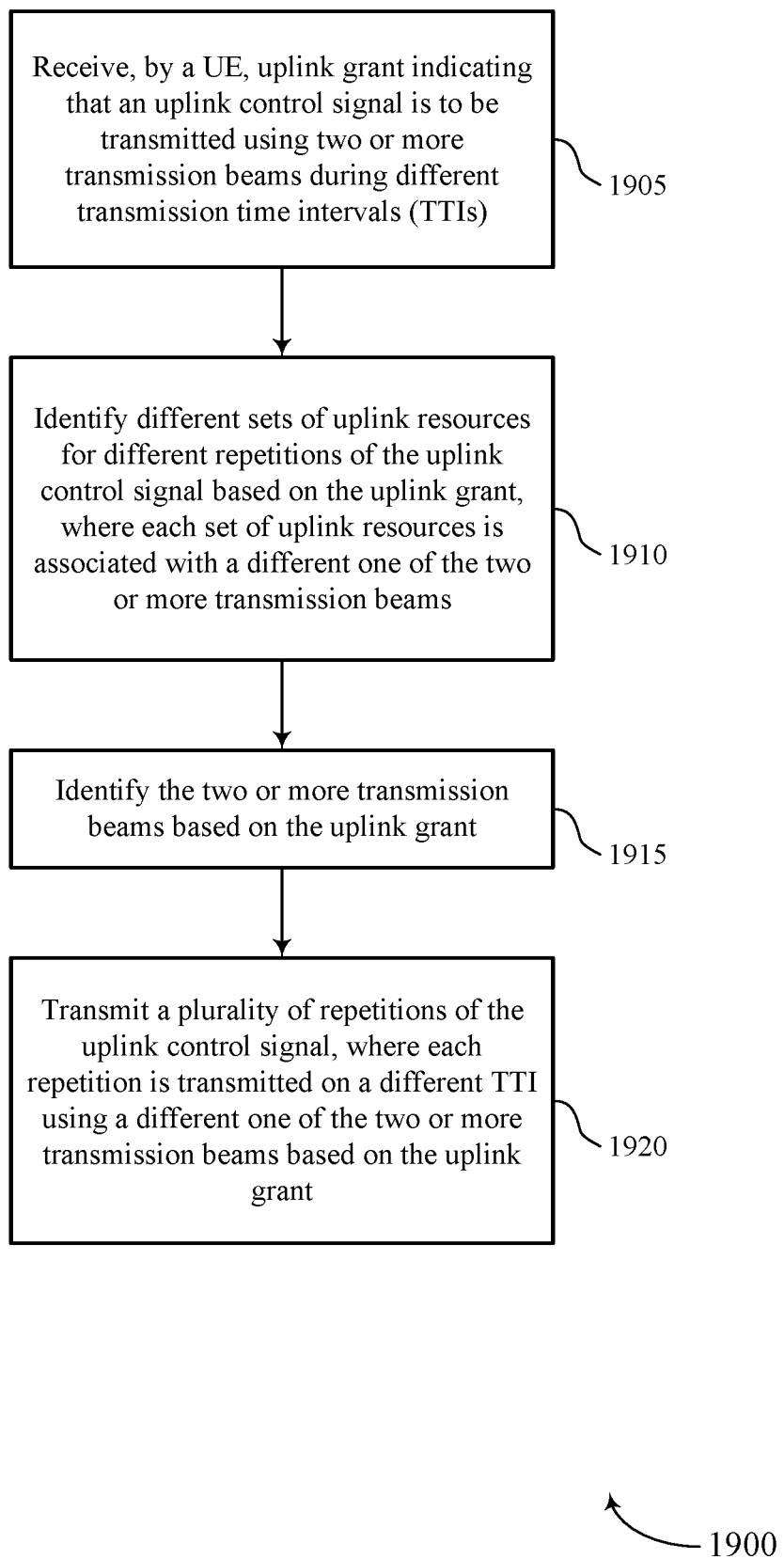

FIG. 19 shows a flowchart illustrating a method 1900 for uplink multi-beam operation in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may receive an uplink grant indicating that an uplink control signal is to be transmitted using two or more transmission beams during different transmission time intervals (TTIs). The operations of 1905 may be performed according to the methods described herein. In certain examples, aspects of the operations of 1905 may be performed by a downlink control signal processor as described with reference to FIGS. 9 through 12.

At 1910, the UE 115 may identify different sets of uplink resources for different repetitions of the uplink control signal based at least in part on the uplink grant, where each set of uplink resources is associated with a different one of the two or more transmission beams. The operations of 1910 may be performed according to the methods described herein. In certain examples, aspects of the operations of 1910 may be performed by a transmission beam identifier as described with reference to FIGS. 9 through 12.

At 1915, the UE 115 may identify the two or more transmission beams based at least in part on the uplink grant. The operations of 1915 may be performed according to the methods described herein. In certain examples, aspects of the operations of 1915 may be performed by a transmission beam identifier as described with reference to FIGS. 9 through 12.

At 1920, the UE 115 may transmit a plurality of repetitions of the uplink control signal, where each repetition is transmitted on a different TTI using a different one of the two or more transmission beams based at least in part on the uplink grant. The operations of 1920 may be performed according to the methods described herein. In certain examples, aspects of the operations of 1920 may be performed by a uplink control signal scheduler as described with reference to FIGS. 9 through 12.

Figure 20:
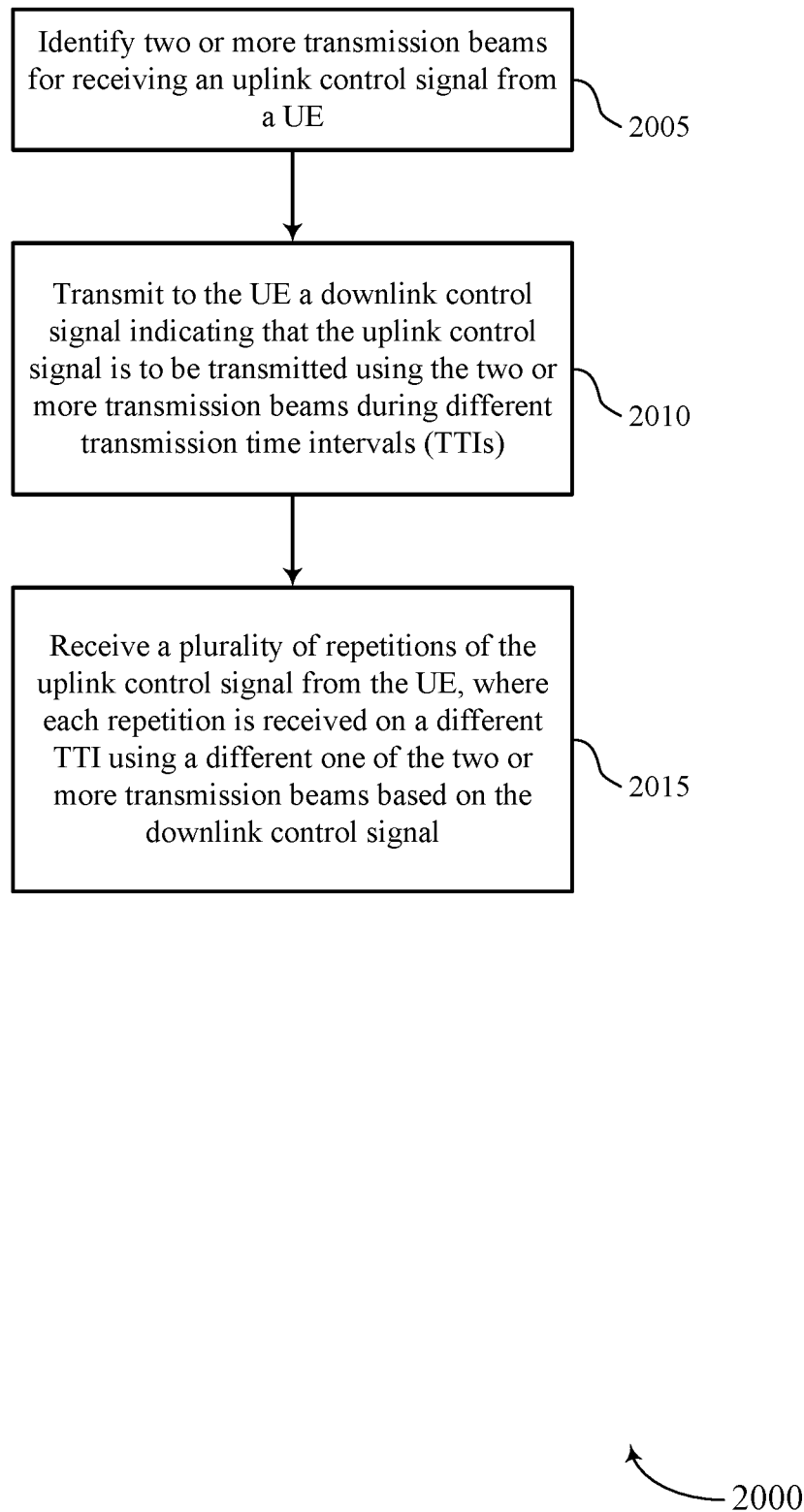

FIG. 20 shows a flowchart illustrating a method 2000 for uplink multi-beam operation in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2005, the base station 105 may identify two or more transmission beams for receiving an uplink control signal from a user equipment (UE) 115. The operations of 2005 may be performed according to the methods described herein. In certain examples, aspects of the operations of 2005 may be performed by a transmission beam identifier as described with reference to FIGS. 13 through 16.

At 2010, the base station 105 may transmit to the UE 115 a downlink control signal indicating that the uplink control signal is to be transmitted using the two or more transmission beams during different transmission time intervals (TTIs). The operations of 2010 may be performed according to the methods described herein. In certain examples, aspects of the operations of 2010 may be performed by a downlink control signal generator as described with reference to FIGS. 13 through 16.

At 2015, the base station 105 may receive a plurality of repetitions of the uplink control signal from the UE 115, where each repetition is received on a different TTI using a different one of the two or more transmission beams based at least in part on the downlink control signal. The operations of 2015 may be performed according to the methods described herein. In certain examples, aspects of the operations of 2015 may be performed by a uplink control signal processor as described with reference to FIGS. 13 through 16.

Figure 21:
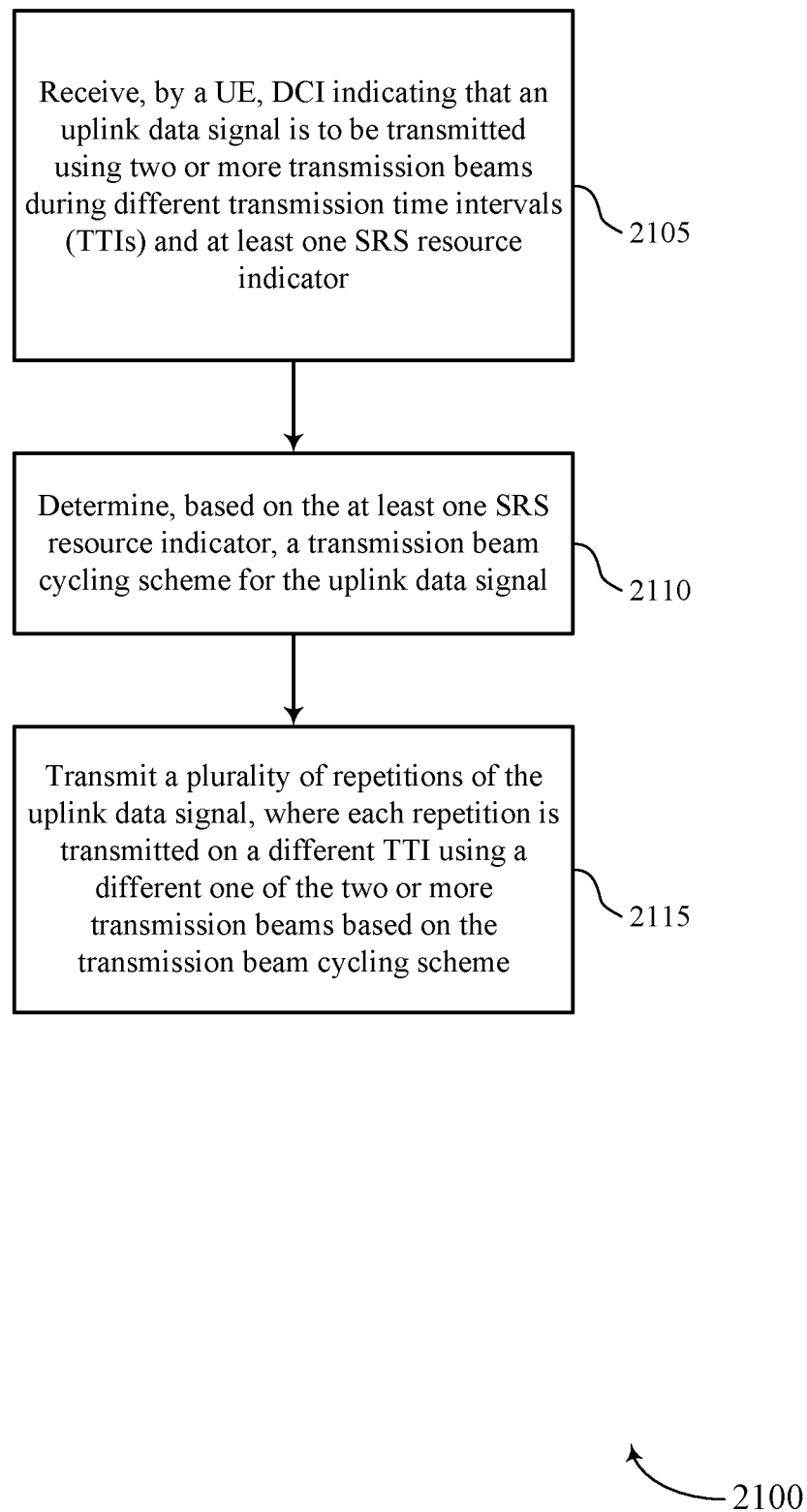

FIG. 21 shows a flowchart illustrating a method 2100 for uplink multi-beam operation in accordance with aspects of the present disclosure. The operations of method 2100 may be implemented by a UE 115 or its components as described herein. For example, the operations of method 2100 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2105, the UE 115 may receive downlink control information (DCI) indicating that an uplink data signal is to be transmitted using two or more transmission beams during different transmission time intervals (TTIs) and at least one sounding reference signal (SRS) resource indicator. The operations of 2105 may be performed according to the methods described herein. In certain examples, aspects of the operations of 2105 may be performed by a DCI processor as described with reference to FIGS. 9 through 12.

At 2110, the UE 115 may determine, based at least in part on the at least one SRS resource indicator, a transmission beam cycling scheme for the uplink data signal. The operations of 2110 may be performed according to the methods described herein. In certain examples, aspects of the operations of 2110 may be performed by a beam cycling scheme determination unit as described with reference to FIGS. 9 through 12.

At 2115, the UE 115 may transmit a plurality of repetitions of the uplink data signal, where each repetition is transmitted on a different TTI using a different one of the two or more transmission beams based at least in part on the beam cycling scheme. The operations of 2115 may be performed according to the methods described herein. In certain examples, aspects of the operations of 2115 may be performed by a uplink data signal generator as described with reference to FIGS. 9 through 12.

Figure 22:
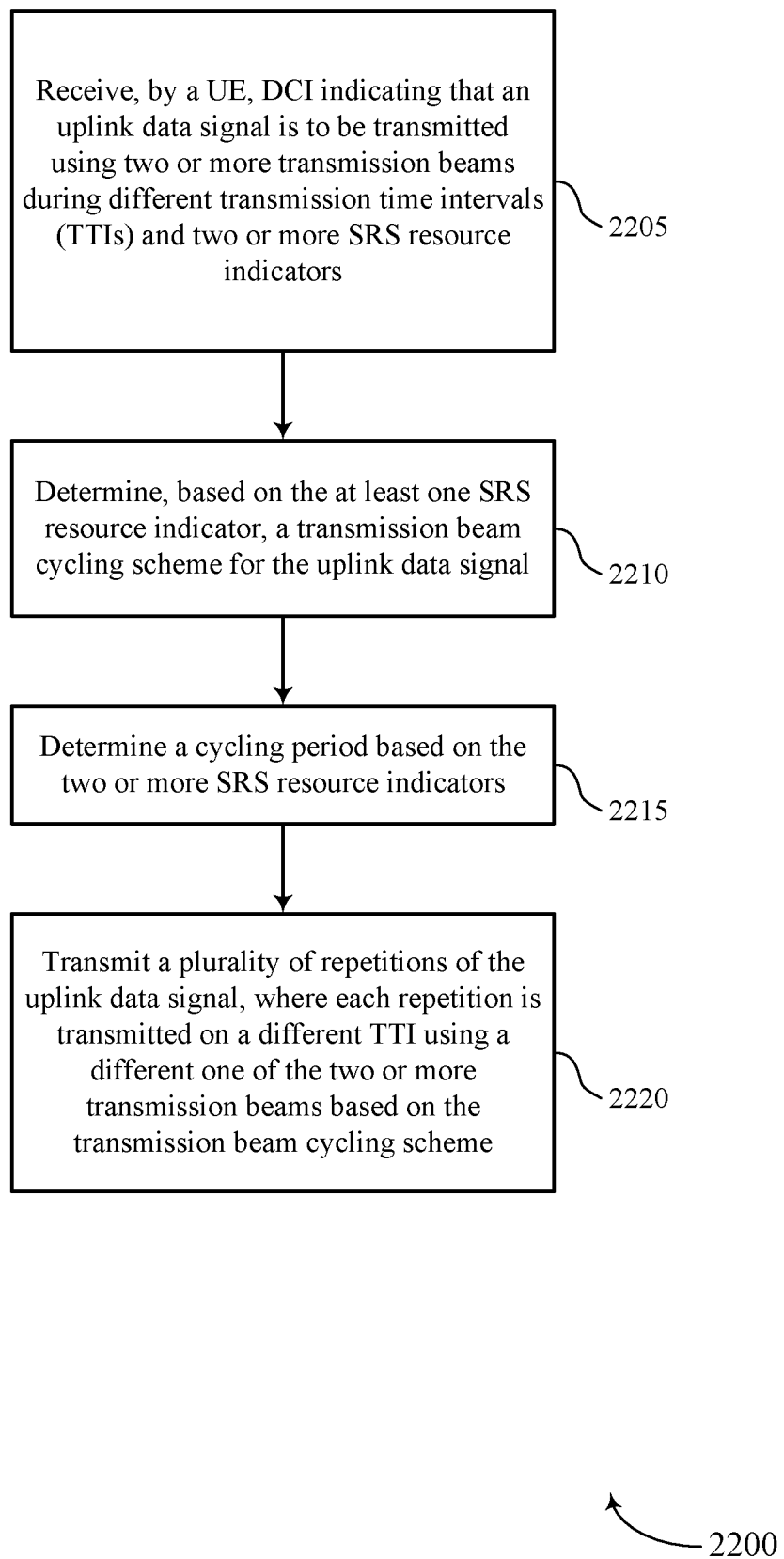

FIG. 22 shows a flowchart illustrating a method 2200 for uplink multi-beam operation in accordance with aspects of the present disclosure. The operations of method 2200 may be implemented by a UE 115 or its components as described herein. For example, the operations of method 2200 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2205, the UE 115 may receive downlink control information (DCI) indicating that an uplink data signal is to be transmitted using two or more transmission beams during different transmission time intervals (TTIs) and two or more sounding reference signal (SRS) resource indicators. The operations of 2205 may be performed according to the methods described herein. In certain examples, aspects of the operations of 2205 may be performed by a DCI processor as described with reference to FIGS. 9 through 12.

At 2210, the UE 115 may determine, based at least in part on the two or more SRS resource indicators, a transmission beam cycling scheme for the uplink data signal. The operations of 2210 may be performed according to the methods described herein. In certain examples, aspects of the operations of 2210 may be performed by a beam cycling scheme determination unit as described with reference to FIGS. 9 through 12.

At 2215, the UE 115 may determine a cycling period based at least in part on the two or more SRS resource indicators. The operations of 2215 may be performed according to the methods described herein. In certain examples, aspects of the operations of 2215 may be performed by a beam cycling scheme determination unit as described with reference to FIGS. 9 through 12.

At 2220, the UE 115 may transmit a plurality of repetitions of the uplink data signal, where each repetition is transmitted on a different TTI using a different one of the two or more transmission beams based at least in part on the transmission beam cycling scheme. The operations of 2220 may be performed according to the methods described herein. In certain examples, aspects of the operations of 2220 may be performed by a uplink data signal generator as described with reference to FIGS. 9 through 12.

Figure 23:
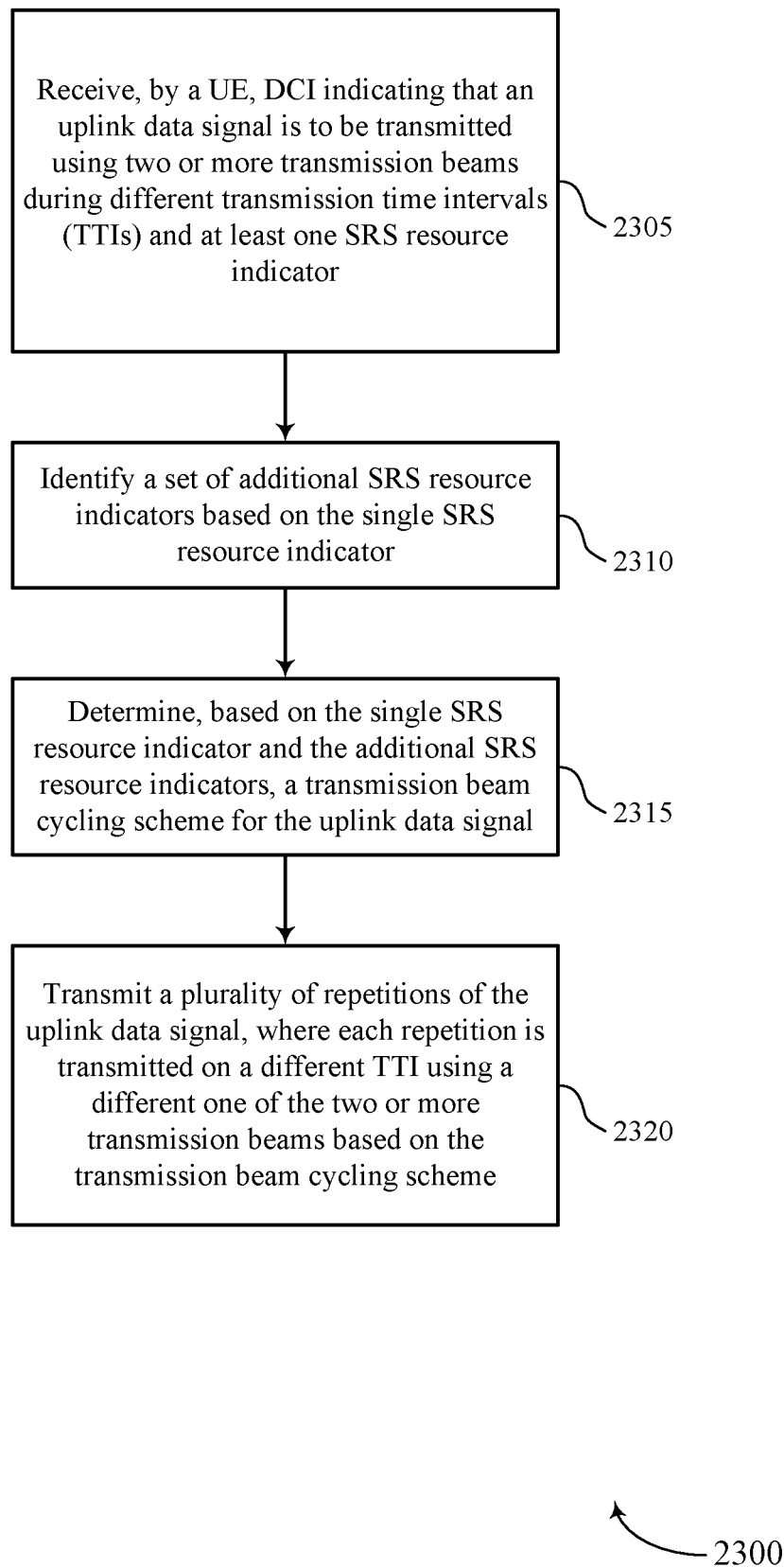

FIG. 23 shows a flowchart illustrating a method 2300 for uplink multi-beam operation in accordance with aspects of the present disclosure. The operations of method 2300 may be implemented by a UE 115 or its components as described herein. For example, the operations of method 2300 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2305, the UE 115 may receive downlink control information (DCI) indicating that an uplink data signal is to be transmitted using two or more transmission beams during different transmission time intervals (TTIs) and a single sounding reference signal (SRS) resource indicator. The operations of 2305 may be performed according to the methods described herein. In certain examples, aspects of the operations of 2305 may be performed by a DCI processor as described with reference to FIGS. 9 through 12.

At 2310, the UE 115 may identify a set of additional SRS resource indicators based at least in part on the single SRS resource indicator. The operations of 2310 may be performed according to the methods described herein. In certain examples, aspects of the operations of 2310 may be performed by an additional SRS resource indicator identifier as described with reference to FIGS. 9 through 12.

At 2315, the UE 115 may determine, based at least in part on the single SRS resource indicator and the additional SRS resource indicators, a transmission beam cycling scheme for the uplink data signal. The operations of 2315 may be performed according to the methods described herein. In certain examples, aspects of the operations of 2315 may be performed by a beam cycling scheme determination unit as described with reference to FIGS. 9 through 12.

At 2320, the UE 115 may transmit a plurality of repetitions of the uplink data signal, where each repetition is transmitted on a different TTI using a different one of the two or more transmission beams based at least in part on the transmission beam cycling scheme. The operations of 2320 may be performed according to the methods described herein. In certain examples, aspects of the operations of 2320 may be performed by a uplink data signal generator as described with reference to FIGS. 9 through 12.

Figure 24:
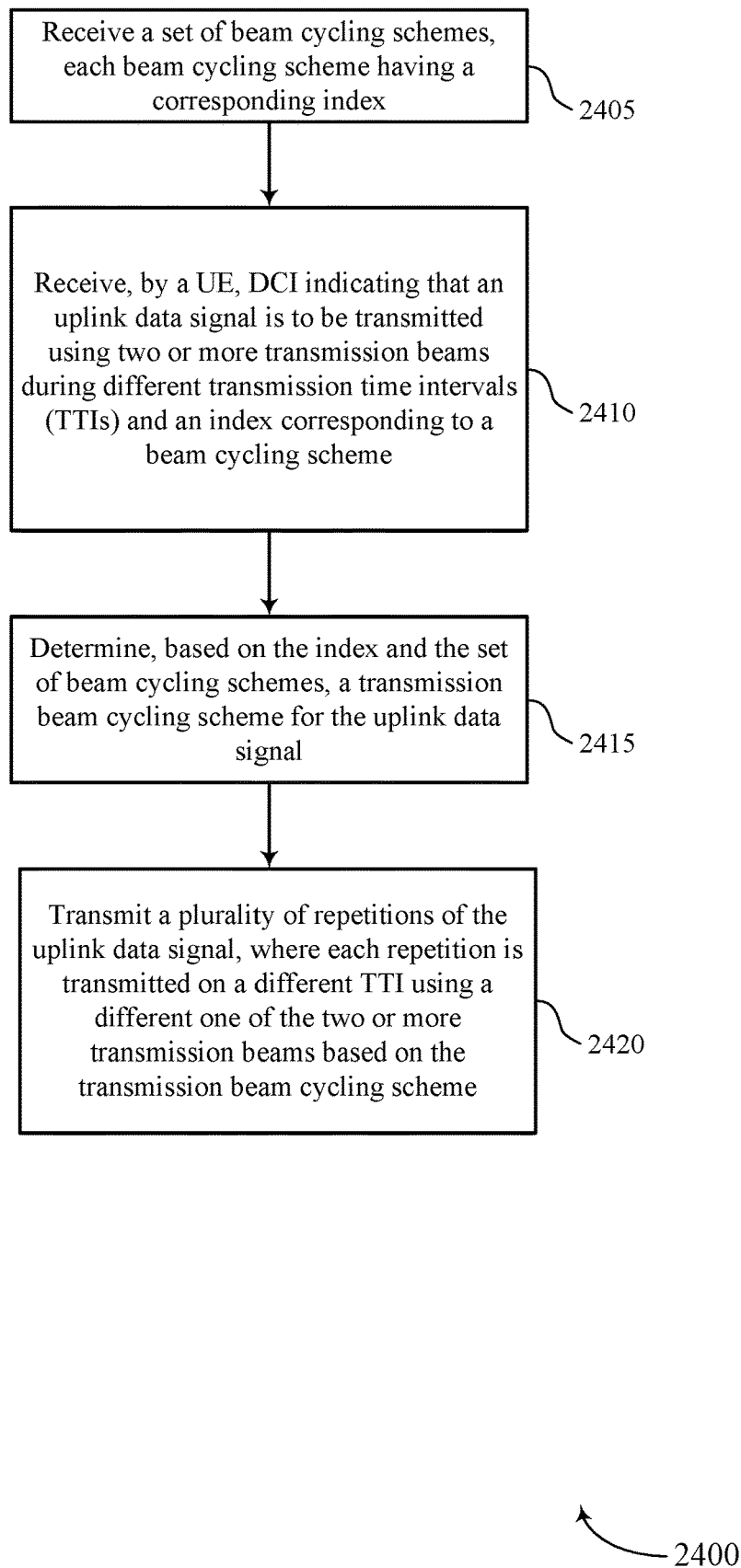

FIG. 24 shows a flowchart illustrating a method 2400 for uplink multi-beam operation in accordance with aspects of the present disclosure. The operations of method 2400 may be implemented by a UE 115 or its components as described herein. For example, the operations of method 2400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2405, the UE 115 may receive a set of beam cycling schemes, each beam cycling scheme having a corresponding index. The operations of 2405 may be performed according to the methods described herein. In certain examples, aspects of the operations of 2405 may be performed by a beam cycling set processor as described with reference to FIGS. 9 through 12.

At 2410, the UE 115 may receive downlink control information (DCI) indicating that an uplink data signal is to be transmitted using two or more transmission beams during different transmission time intervals (TTIs) and an index corresponding to a beam cycling scheme. The operations of 2410 may be performed according to the methods described herein. In certain examples, aspects of the operations of 2410 may be performed by a DCI processor as described with reference to FIGS. 9 through 12.

At 2415, the UE 115 may determine, based at least in part on the index and the set of beam cycling schemes, a transmission beam cycling scheme for the uplink data signal. The operations of 2415 may be performed according to the methods described herein. In certain examples, aspects of the operations of 2415 may be performed by a beam cycling scheme determination unit as described with reference to FIGS. 9 through 12.

At 2420, the UE 115 may transmit a plurality of repetitions of the uplink data signal, where each repetition is transmitted on a different TTI using a different one of the two or more transmission beams based at least in part on the beam cycling scheme. The operations of 2420 may be performed according to the methods described herein. In certain examples, aspects of the operations of 2420 may be performed by a uplink data signal generator as described with reference to FIGS. 9 through 12.

Figure 25:
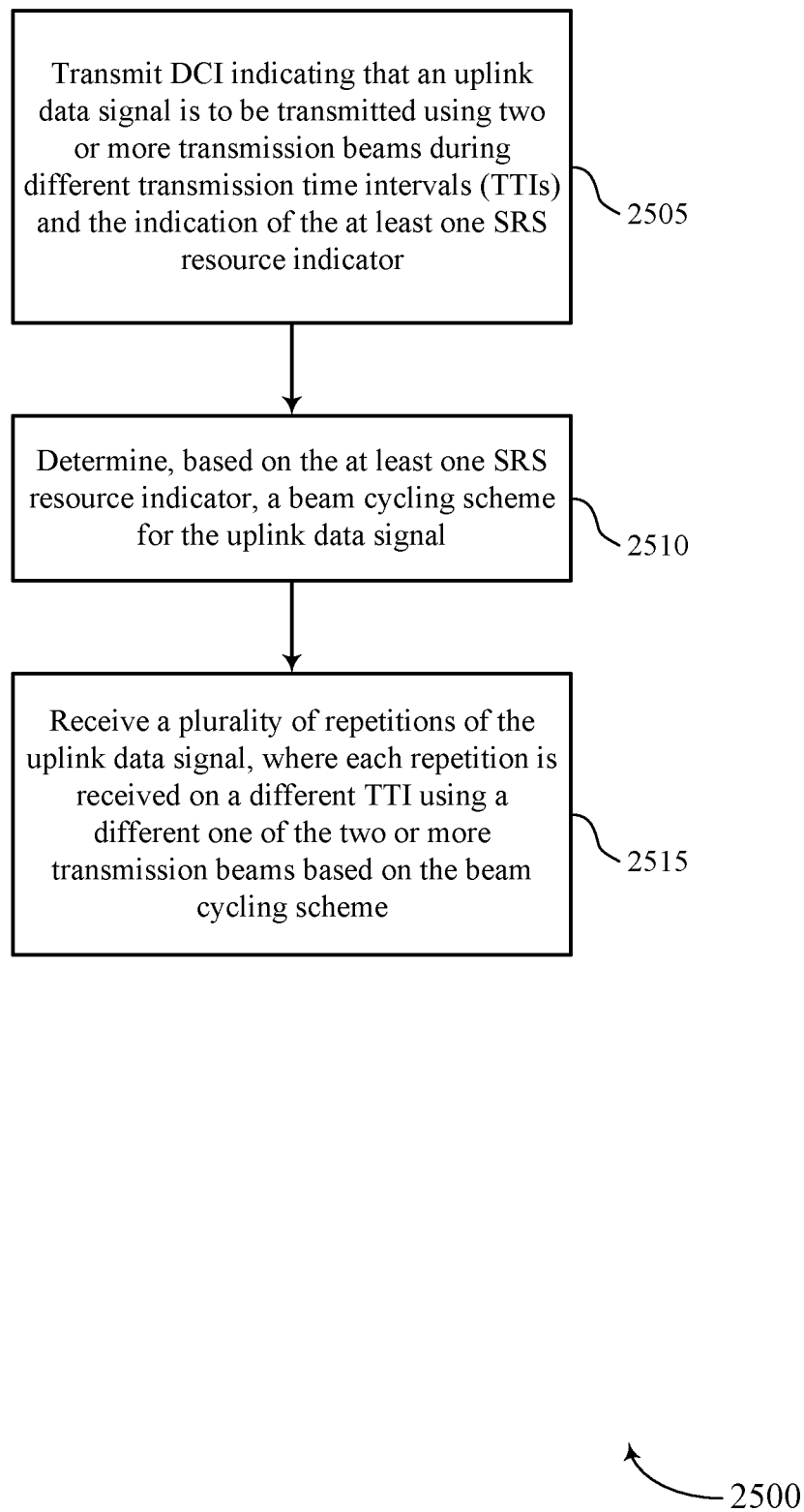

FIG. 25 shows a flowchart illustrating a method 2500 for uplink multi-beam operation in accordance with aspects of the present disclosure. The operations of method 2500 may be implemented by a base station 105 or its components as described herein. For example, the operations of method 2500 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2505, the base station 105 may transmit downlink control information (DCI) indicating that an uplink data signal is to be transmitted using two or more transmission beams during different transmission time intervals (TTIs) and the indication of the at least one SRS resource indicator. The operations of 2505 may be performed according to the methods described herein. In certain examples, aspects of the operations of 2505 may be performed by a DCI generator as described with reference to FIGS. 13 through 16.

At 2510, the base station 105 may determine, based at least in part on the at least one SRS resource indicator, a beam cycling scheme for the uplink data signal. The operations of 2510 may be performed according to the methods described herein. In certain examples, aspects of the operations of 2510 may be performed by a beam cycling scheme determination unit as described with reference to FIGS. 13 through 16.

At 2515, the base station 105 may receive a plurality of repetitions of the uplink data signal, where each repetition is received on a different TTI using a different one of the two or more transmission beams based at least in part on the beam cycling scheme. The operations of 2515 may be performed according to the methods described herein. In certain examples, aspects of the operations of 2515 may be performed by a uplink data signal processor as described with reference to FIGS. 13 through 16.

Figure 26:
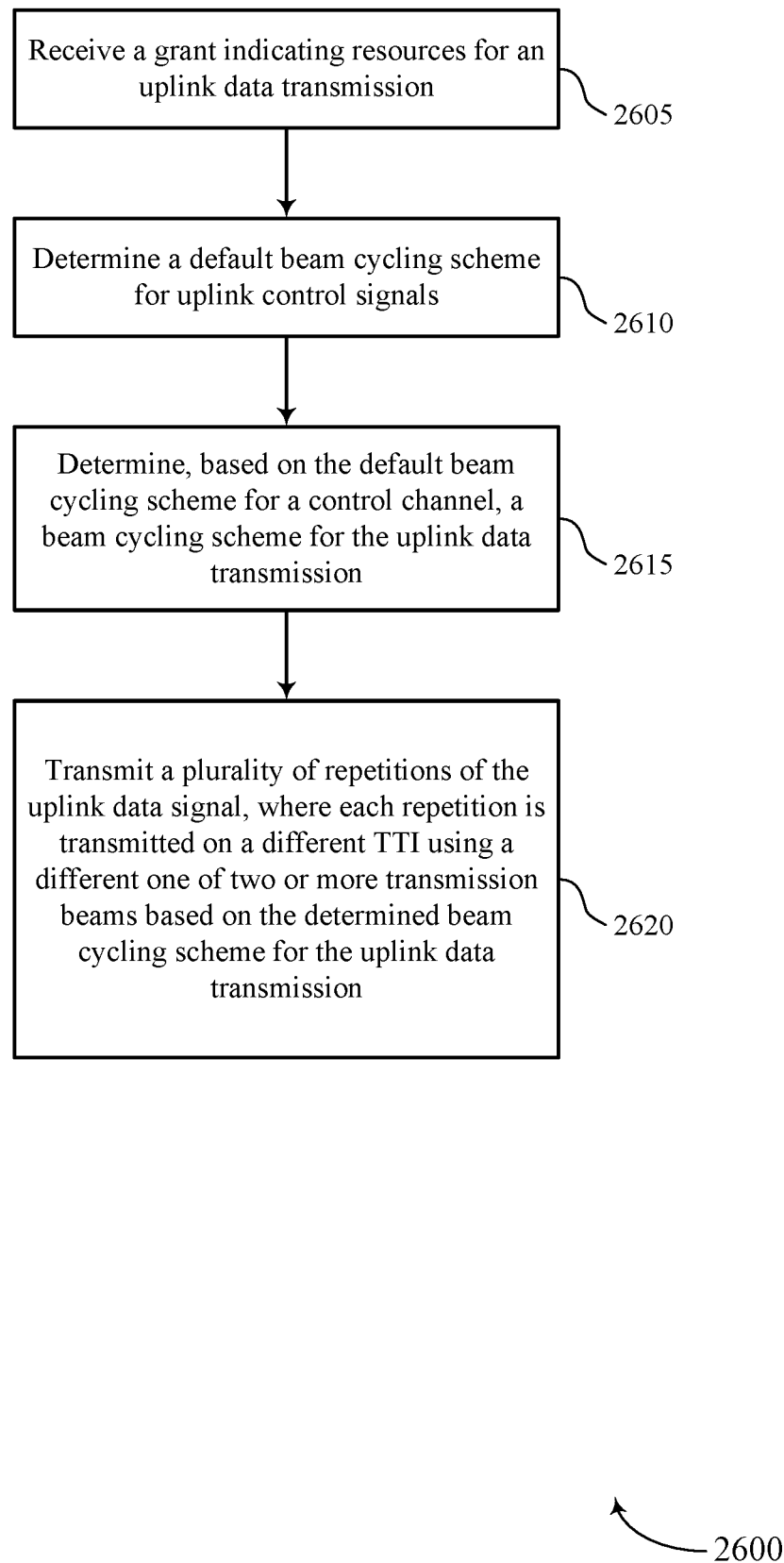

FIG. 26 shows a flowchart illustrating a method 2600 for uplink multi-beam operation in accordance with aspects of the present disclosure. The operations of method 2600 may be implemented by a UE 115 or its components as described herein. For example, the operations of method 2600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 2605, the UE 115 may receive a grant indicating resources for an uplink data transmission. The operations of 2605 may be performed according to the methods described herein. In certain examples, aspects of the operations of 2605 may be performed by a grant processor as described with reference to FIGS. 9 through 12.

At 2610, the UE 115 may determine a default beam cycling scheme for uplink control signals. The operations of 2610 may be performed according to the methods described herein. In certain examples, aspects of the operations of 2610 may be performed by a default beam cycling scheme identifier as described with reference to FIGS. 9 through 12.

At 2615, the UE 115 may determine, based at least in part on the default beam cycling scheme for a control channel, a beam cycling scheme for the uplink data transmission. The operations of 2615 may be performed according to the methods described herein. In certain examples, aspects of the operations of 2615 may be performed by a beam cycling scheme determination unit as described with reference to FIGS. 9 through 12.

At 2620, the UE 115 may transmit a plurality of repetitions of the uplink data signal, where each repetition is transmitted on a different transmission time interval (TTI) using a different one of two or more transmission beams based at least in part on the determined beam cycling scheme for the uplink data transmission. The operations of 2620 may be performed according to the methods described herein. In certain examples, aspects of the operations of 2620 may be performed by a uplink data signal scheduler as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, by a user equipment (UE), a downlink control signal comprising one or more sounding reference signal (SRS) resource indicators, the SRS resource indicator comprises an index to power control parameters, the downlink control signal indicating that an uplink control signal is to be transmitted using two or more transmission beams during different transmission time intervals (TTIs);
identifying the two or more transmission beams based at least in part on the downlink control signal; and
transmitting, based at least in part on the power control parameters, a plurality of repetitions of the uplink control signal, wherein each repetition is transmitted on a different TTI using a different one of the two or more transmission beams based at least in part on the downlink control signal.

2. The method of claim 1, wherein the downlink control signal is a radio resource control (RRC) signal, and further comprising:
receiving a beam cycling information element in the RRC signal, the beam cycling information element indicating a number of the two or more transmission beams.

3. The method of claim 2, wherein the beam cycling information element is associated with one or more of: an uplink resource of the uplink control signal or a type of uplink resource of the uplink control signal.

4. The method of claim 1, wherein the downlink control signal comprises an uplink grant for the uplink control signal, and further comprising:
identifying different sets of uplink resources for different repetitions of the uplink control signal based at least in part on the uplink grant, wherein each set of uplink resources is associated with a different one of the two or more transmission beams.

5. The method of claim 4, wherein the uplink grant comprises a persistent or semi-persistent grant.

6. The method of claim 1, further comprising:
receiving a plurality of spatial relation information elements, each spatial relation information element associated with a different transmission beam, wherein identifying the two or more transmission beams is further based at least in part on the plurality of spatial relation information elements.

7. The method of claim 6, wherein identifying the two or more transmission beams comprises:
selecting the two or more transmission beams based at least in part on an order of the plurality of spatial relation information elements.

8. The method of claim 6, wherein identifying the two or more transmission beams comprises:
receiving a medium access control (MAC) control element (CE) indicating a set of spatial relation information elements corresponding to the two or more transmission beams in the plurality of received spatial relation information elements.

9. The method of claim 6, wherein an order of transmitting the plurality of repetitions of the uplink control signal is based at least in part on an order of the received spatial relation information elements.

10. The method of claim 1, wherein transmitting the plurality of repetitions of the uplink control signal using the two or more transmission beams comprises:
cycling through the two or more transmission beams based at least in part on a transmitted TTI index, an absolute TTI index associated with the uplink control signal, or a group of TTIs associated with the uplink control signal (i.e. per N-TTI basis).

11. The method of claim 1, further comprising:
selecting a power control parameter for transmitting each of the plurality of repetitions of the uplink control signal.

12. The method of claim 11, wherein a first power control parameter for transmission in a first TTI is selected based at least in part on a previous power control parameter for transmission in a previous TTI.

13. The method of claim 12, wherein the first power control parameter for transmission in the first TTI is selected based at least in part on the first TTI.

14. A method for wireless communication, comprising:
receiving, by a user equipment (UE), downlink control information (DCI) indicating that an uplink data signal is to be transmitted using two or more transmission beams during different transmission time intervals (TTIs) and at least one sounding reference signal (SRS) resource indicator, the SRS resource indicator comprises an index to power control parameters;
determining, based at least in part on the at least one SRS resource indicator, a transmission beam cycling scheme for the uplink data signal; and
transmitting, based at least in part on the power control parameters, a plurality of repetitions of the uplink data signal, wherein each repetition is transmitted on a different TTI using a different one of the two or more transmission beams based at least in part on the transmission beam cycling scheme.

15. The method of claim 14, wherein the DCI comprises two or more resource indicators, and further comprising:
determining a cycling period based at least in part on the two or more SRS resource indicators.

16. The method of claim 15, wherein the plurality of repetitions of the uplink data signal are transmitted in transmission opportunities following resources indicated by the two or more SRS resource indicators.

17. The method of claim 14, wherein the DCI comprises a single SRS resource indicators, and further comprising:
identifying a set of additional SRS resource indicators based at least in part on the single SRS resource indicator.

18. The method of claim 14, wherein the DCI comprises an index corresponding to the transmission beam cycling scheme.

19. The method of claim 18, further comprising:
receiving a set of beam cycling schemes, each beam cycling scheme having a corresponding index.

20. The method of claim 19, further comprising:
determining the beam cycling scheme based at least in part on the index.

21. A method for wireless communication, comprising:
receiving a grant indicating resources for an uplink data transmission;
receiving at least one sounding reference signal (SRS) resource indicator, the SRS resource indicator comprises an index to power control parameters;
determining a default beam cycling scheme for uplink control signals;
determining, based at least in part on the default beam cycling scheme for a control channel, a beam cycling scheme for the uplink data transmission; and
transmitting, based at least in part on the power control parameters, a plurality of repetitions of the uplink data signal, wherein each repetition is transmitted on a different transmission time interval (TTI) using a different one of two or more transmission beams based at least in part on the determined beam cycling scheme for the uplink data transmission.

22. The method of claim 21, further comprising:
identifying the configuration comprises identifying a default beam for a physical uplink shared channel associated with the uplink data transmission; and
the default beam cycling scheme for the control channel is based at least in part on the default beam for the physical uplink shared channel.

23. The method of claim 21, wherein the control channel comprises one or more of: an uplink control channel or a downlink control channel.

24. An apparatus for wireless communication, comprising:
- a processor;
- memory coupled with the processor; and
- instructions stored in the memory and executable by the processor to cause the apparatus to:
- receive, by the apparatus, a downlink control signal comprising one or more sounding reference signal (SRS) resource indicators, the SRS resource indicator comprises an index to power control parameters, the downlink control signal indicating that an uplink control signal is to be transmitted using two or more transmission beams during different transmission time intervals (TTIs);
- identify the two or more transmission beams based at least in part on the downlink control signal; and
- transmit, based at least in part on the power control parameters, a plurality of repetitions of the uplink control signal, wherein each repetition is transmitted on a different TTI using a different one of the two or more transmission beams based at least in part on the downlink control signal.

25. The apparatus of claim 24, wherein the downlink control signal is a radio resource control (RRC) signal, and wherein the instructions are further executable by the processor to cause the apparatus to:
- receive a beam cycling information element in the RRC signal, the beam cycling information element indicating a number of the two or more transmission beams, wherein the beam cycling information element is associated with one or more of: an uplink resource of the uplink control signal or a type of uplink resource of the uplink control signal.

26. The apparatus of claim 24, wherein the downlink control signal comprises an uplink grant for the uplink control signal, and wherein the instructions are further executable by the processor to cause the apparatus to:
- identify different sets of uplink resources for different repetitions of the uplink control signal based at least in part on the uplink grant, wherein each set of uplink resources is associated with a different one of the two or more transmission beams, wherein the uplink grant comprises a persistent or semi-persistent grant.

27. The apparatus of claim 24, wherein the instructions are further executable by the processor to cause the apparatus to:
- receive a plurality of spatial relation information elements, each spatial relation information element associated with a different transmission beam, wherein identifying the two or more transmission beams is further based at least in part on the spatial relation information elements, and wherein the instructions to identify the two or more transmission beams are executable by the processor to cause the apparatus to:
- select the two or more transmission beams based at least in part on an order of the spatial relation information elements; and
- receive a medium access control (MAC) control element (CE) indicating a set of spatial relation information elements corresponding to the two or more transmission beams in the plurality of received spatial relation information elements.

28. The apparatus of claim 27, wherein an order of transmitting the plurality of repetitions of the uplink control signal is based at least in part on an order of the received spatial relation information elements.

29. The apparatus of claim 24, wherein the instructions to transmit the plurality of repetitions of the uplink control signal using the two or more transmission beams are executable by the processor to cause the apparatus to:
- cycle through the two or more transmission beams based at least in part on a transmitted TTI index, an absolute TTI index associated with the uplink control signal, or a group of TTIs associated with the uplink control signal (i.e. per N-TTI basis).

30. The apparatus of claim 24, wherein the instructions are further executable by the processor to cause the apparatus to:
- select a power control parameter for transmitting each of the plurality of repetitions of the uplink control signal.

* * * * *